(12) United States Patent
Nyamjav et al.

(10) Patent No.: US 10,047,971 B2
(45) Date of Patent: Aug. 14, 2018

(54) HOME AUTOMATION SYSTEM

(71) Applicant: Ametros Solutions LLC, Philadelphia, PA (US)

(72) Inventors: Dorjderem Nyamjav, Philadelphia, PA (US); Tulgabaatar Dashdorj, Ulaanbaatar (MN)

(73) Assignee: Ametros Solutions LLC, Philadelphia, PA (US)

( * ) Notice: Subject to any disclaimer, the term of this patent is extended or adjusted under 35 U.S.C. 154(b) by 301 days.

(21) Appl. No.: 15/130,546

(22) Filed: Apr. 15, 2016

(65) Prior Publication Data

US 2017/0299210 A1    Oct. 19, 2017

(51) Int. Cl.
| | |
|---|---|
| H04L 12/28 | (2006.01) |
| F24F 11/30 | (2018.01) |
| H04W 84/12 | (2009.01) |
| H04W 88/02 | (2009.01) |
| F24F 11/56 | (2018.01) |
| F24F 11/52 | (2018.01) |
| F24F 11/65 | (2018.01) |
| H04W 4/80 | (2018.01) |

(52) U.S. Cl.
CPC .......... *F24F 11/30* (2018.01); *H04L 12/282* (2013.01); *F24F 11/52* (2018.01); *F24F 11/56* (2018.01); *F24F 11/65* (2018.01); *G05B 2219/2614* (2013.01); *G05B 2219/2642* (2013.01); *H04W 4/80* (2018.02); *H04W 84/12* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 8,413,204 | B2* | 4/2013 | White | H04L 12/2809 725/110 |
| 8,490,006 | B1* | 7/2013 | Reeser | G05B 15/02 700/18 |
| 9,772,612 | B2* | 9/2017 | McCarthy, III | G05B 15/02 |
| 9,872,088 | B2* | 1/2018 | Fadell | H04Q 9/00 |
| 9,872,249 | B2* | 1/2018 | Kates | H04W 84/18 |
| 2002/0180497 | A1* | 12/2002 | Kim | G06F 1/24 327/143 |
| 2014/0285116 | A1* | 9/2014 | Ng | H05B 37/0227 315/320 |

(Continued)

*Primary Examiner* — Isaac T Tecklu

(57) ABSTRACT

A comprehensive home automation system enables a real-time communication between the house and the owner. The system offers a set of monitoring, notifying and other automated functions around the house to homeowners. The home automation system includes a central control unit (CCU) and a plurality of end nodes that provide different measurements and control functions. A low-rate wireless personal area network is also provided for communications with the end nodes. The CCU enables the system to analyze and react to events in predetermined ways, and ultimately to self-learn the homeowner's daily routine and to act in an anticipatory fashion. The end nodes include multiple detectors, light switches, controllers for HVAC, wall outlets and extension cords, home entertainment systems, video surveillance devices, and the like. The end nodes also may be Zigbee enabled devices that include detectors for fire, intrusion, flood, total air quality, and the like.

24 Claims, 37 Drawing Sheets

(56) References Cited

U.S. PATENT DOCUMENTS

| | | | |
|---|---|---|---|
| 2014/0375144 A1* | 12/2014 | Thorpe | G05B 9/02 |
| | | | 307/129 |
| 2015/0193127 A1* | 7/2015 | Chai | G08B 13/19645 |
| | | | 715/719 |
| 2015/0309484 A1* | 10/2015 | Lyman | G05B 13/0205 |
| | | | 700/275 |
| 2016/0040902 A1* | 2/2016 | Shah | F24F 11/006 |
| | | | 700/277 |
| 2016/0308686 A1* | 10/2016 | Vijayrao | H04L 12/2803 |
| 2017/0118504 A1* | 4/2017 | White | H04N 21/43615 |
| 2017/0127124 A9* | 5/2017 | Wilson | H04N 21/43615 |
| 2017/0176961 A1* | 6/2017 | Tirpak | G05B 15/02 |
| 2017/0191695 A1* | 7/2017 | Bruhn | G05B 15/02 |
| 2017/0192402 A1* | 7/2017 | Karp | F24F 11/30 |
| 2017/0374437 A1* | 12/2017 | Schwarzkopf | H04Q 9/00 |

* cited by examiner

HOME AUTOMATION SYSTEM

TECHNICAL FIELD

The invention relates to smart automation and the design, components, operating principles, and functionalities of a smart automation system. Particularly, the invention relates to a smart home automation system that features a high performance microprocessor and customized operating system that is capable of computing complex calculations on the data from end terminals to implement pattern recognition functions, self-learning, and respective energy saving modes. Furthermore, the invention relates to cluster based smart city network including a plurality of the smart home automation systems described herein.

BACKGROUND

Home automation is becoming a new area of development for smart devices thanks to accelerated development of the Internet of Things (iOT) and improved data communication speeds. Previously existing technologies such as camera based security solutions and HVAC controllers are being integrated into home automation systems as a part of this process. Partly due to this process, home automation systems have evolved into four separate, clearly distinguishable types, each focusing on different possibilities of automation: security, entertainment, light switches, and HVAC.

However, previous home automation systems have been limited to connecting the user to various household appliances and have not been focused on true automation where a system can automatically evaluate and perform specific functions in response to a particular situation. For instance, a system is known that offers the ability to turn the lights on/off in response to stimuli. This type of system only responds to the input of the user, i.e. a request-only system. Such systems do not provide home automation but rather provide home control. While there have been attempts to integrate all control functions into a single system, challenges to such integration include varying communication protocols, different manufacturers, overall integrating mechanisms, and so on.

On the other hand, systems that offer automated services are mostly geared towards one specific function instead of a wide array of functionalities. For example, there have been developments in the area of HVAC where a system is potentially capable of taking over control of the household HVAC functions independent of the user inputs. However, these are once again limited to very specific functions.

Development of home automation is also driven by emerging new technologies, such as Zigbee, Z-wave and processing units for mobile applications. However, to date, such technologies have not been effectively integrated to provide an all-inclusive home automation system that integrates the above-mentioned 4 types of automation and control functionalities into one complete system. A home automation system is desired that is capable of taking automated actions based on self-learning and, more importantly, is self-evolving. A home automation system is desired that provides an automation solution based on behavioral analyses and complex mathematical algorithm aimed at transferring control functions away from the user to the system so that household functions are truly automated. The invention addresses these and other needs in the art.

SUMMARY

The invention relates to comprehensive home automation system, Dobu, that enables a real-time communication between the house and the owner. This system is capable of offering a set of monitoring, notifying and other automated functions around the house to homeowners. This invention centers around a smart home automation system featuring advanced solutions in both hardware and software that together provide true home automation as opposed to automated control. The home automation system can not only perform high volume calculations, but also can self-learn and take the appropriate automated actions without user input.

In an exemplary embodiment, Dobu includes a central control unit (CCU) and a plurality of end nodes that provide different measurements and control functions. In the exemplary embodiment, the CCU utilizes ARM-based System-on-Chips that enable high speed data processing, complex computing and real-time applications. Dobu also employs a low-rate wireless personal area network that has the ability to function in several different, low power consuming modes (WPAN/IEEE 802.15.4). The CCU enables the system to analyze and react to events in predetermined ways, and ultimately to self-learn the homeowner's daily routine and to act in an anticipatory fashion. In exemplary embodiments, the end nodes include multiple detectors, light switches, controllers for HVAC, wall outlets and extension cords, home entertainment systems, video surveillance devices, and the like. The end nodes also may be Zigbee enabled devices that include detectors for fire, intrusion, flood, total air quality, and the like.

In exemplary embodiments of the invention, a home automation system is provided that includes a plurality of detectors that detect at least one of fire, home intrusion, flood, air quality, lighting status, door lock status, heating and air conditioning status, and entertainments system status, a user interface, and a control unit programmed to:

communicate with the plurality of detectors to select modes of operation of the detectors, to receive notifications and alert messages from the plurality of detectors, to provide the notifications and alert messages to a user, store commands, data, and events detected by the plurality of detectors, perform timeline analysis and user behavior analysis on the stored commands, data and detected events to recognize usage patterns for home systems and to recommend an action plan for changing settings of the home systems, and provide control commands to the home systems based on the recommended action plan and/or based on instructions provided by the user in response to the recommended action plan. The system may further include a server that connects the control unit to a user access platform via an Internet connection and communicates with a remote emergency and/or security service. Also, the user access platform may be provided on a remote unit including a computer, a smart phone, and/or a tablet.

In the exemplary embodiments, the control unit further includes a combination antenna for at least three different wireless communication protocols including Wi-Fi, Bluetooth, and Zigbee communications and another antenna for cellular network based communication. A resetting circuit is also provided that has inputs connected to home and power buttons and an output connected to a reset of a power chip of the control unit. The resetting circuit includes circuitry whereby a reset signal is provided to the output only when both the home and power buttons are depressed simultaneously. Also, in the exemplary embodiments, the user interface may comprise a plurality of configurable icon groupings that are configurable by a user by function, where each icon represents a detector output and/or a home system that is controlled by the system.

In operation, the modes of operation of the detectors selected by the control unit include low power modes for limiting power consumption of the detectors during normal operation. Also, the plurality of detectors may include a fire detector comprising a microcontroller, a smoke sensor, and a temperature sensor, wherein the microcontroller selectively powers the smoke sensor and temperature sensor in different modes of operation to conserve power. In an exemplary embodiment, the smoke sensor includes an Infrared-Light emitting diode and a photovoltaic transistor and provides an output voltage to the microcontroller indicating whether or not smoke is present. Also, the different modes of operation include a mode in which only the smoke sensor or the temperature sensor is active until smoke or a temperature increase is detected, wherein once smoke is detected, the microcontroller activates the temperature sensor, informs the microcontroller, and monitors continuously with both sensors or once a temperature increase is detected, the microcontroller activates the smoke sensor, informs the microcontroller, and monitors continuously with both sensors, and wherein the microcontroller alerts the control unit of a likely fire if both smoke and a temperature increase are detected. Similar operations are provided for an intrusion detector comprising a microcontroller, a motion sensor, and a sound sensor, wherein the microcontroller selectively powers the motion sensor and sound sensor in different modes of operation to conserve power, a flood detector comprising a microcontroller and a water leakage sensor, and an air quality detector comprising a microcontroller, a carbon dioxide and total volatile organic compounds (TVOC) sensor, a humidity and temperature sensor, a dust sensor, and an ambient light sensor, wherein the microcontroller powers the carbon dioxide and TVOC sensor, humidity and temperature sensor, dust sensor, total volatile organic compounds sensor, and ambient light sensor in different modes of operation to conserve power.

In the exemplary embodiments, the control unit includes an initiating service management that processes communications between the user and the detectors, including providing notifications and alert messages to the user; communications between the control unit and the server; communications between the control unit Zigbee enabled devices including the plurality of detectors; and data storage for commands, and events, etc. The control unit further runs an intelligent service management that performs iterative timeline analysis and user behavior analysis on the stored data to recognize usage patterns, does pattern based classification, proposes different working schedules to the user as recommendations, implements the recommendations approved by the user and further monitors and analyzes home usages and patterns. The recommendations include minimizing utility usage, providing comfort for a specific user or larger group of users, or setting the home for a special event. In exemplary embodiments, the intelligent service management recommends at least one of the following modes to the user based on user behavior analysis and/or timeline analysis: an Eco mode for minimizing utility consumption, a Comfort mode for creating a comfortable environment for a user, a Family Comfort mode for creating a comfortable environment for multiple users, and an Event mode for creating an environment for a special occasion.

Further embodiments of the invention include incorporation of a plurality of home automation systems into a smart city network. In such a smart city network, citywide daily operational decisions are optimized and automated. These may include energy savings, distributions, traffic loads, and security of neighborhoods, etc. In order to facilitate the massive data transfer for implementing such a smart city, some basic or local units are located throughout the city. These units perform certain functions locally in a standalone fashion but also act as a gateway to the larger network. The home automation systems of the invention may be incorporated as local units that function to integrate individual systems into a single smart city network.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

BRIEF DESCRIPTION OF THE DRAWINGS

The above and other features of the invention will be more readily understood upon consideration of the attached drawings and of the following detailed description of those drawings and the presently-preferred and other embodiments of the invention, of which.

DETAILED DESCRIPTION OF ILLUSTRATIVE EMBODIMENTS

Certain specific details are set forth in the following description with respect to FIGS. 1-38 to provide a thorough understanding of various embodiments of the invention. Certain well-known details are not set forth in the following disclosure, however, to avoid unnecessarily obscuring the various embodiments of the invention. Those of ordinary skill in the relevant art will understand that they can practice other embodiments of the invention without one or more of the details described below. Also, while various methods are described with reference to steps and sequences in the following disclosure, the description is intended to provide a clear implementation of embodiments of the invention, and the steps and sequences of steps should not be taken as required to practice the invention.

System Overview

Figure 1:
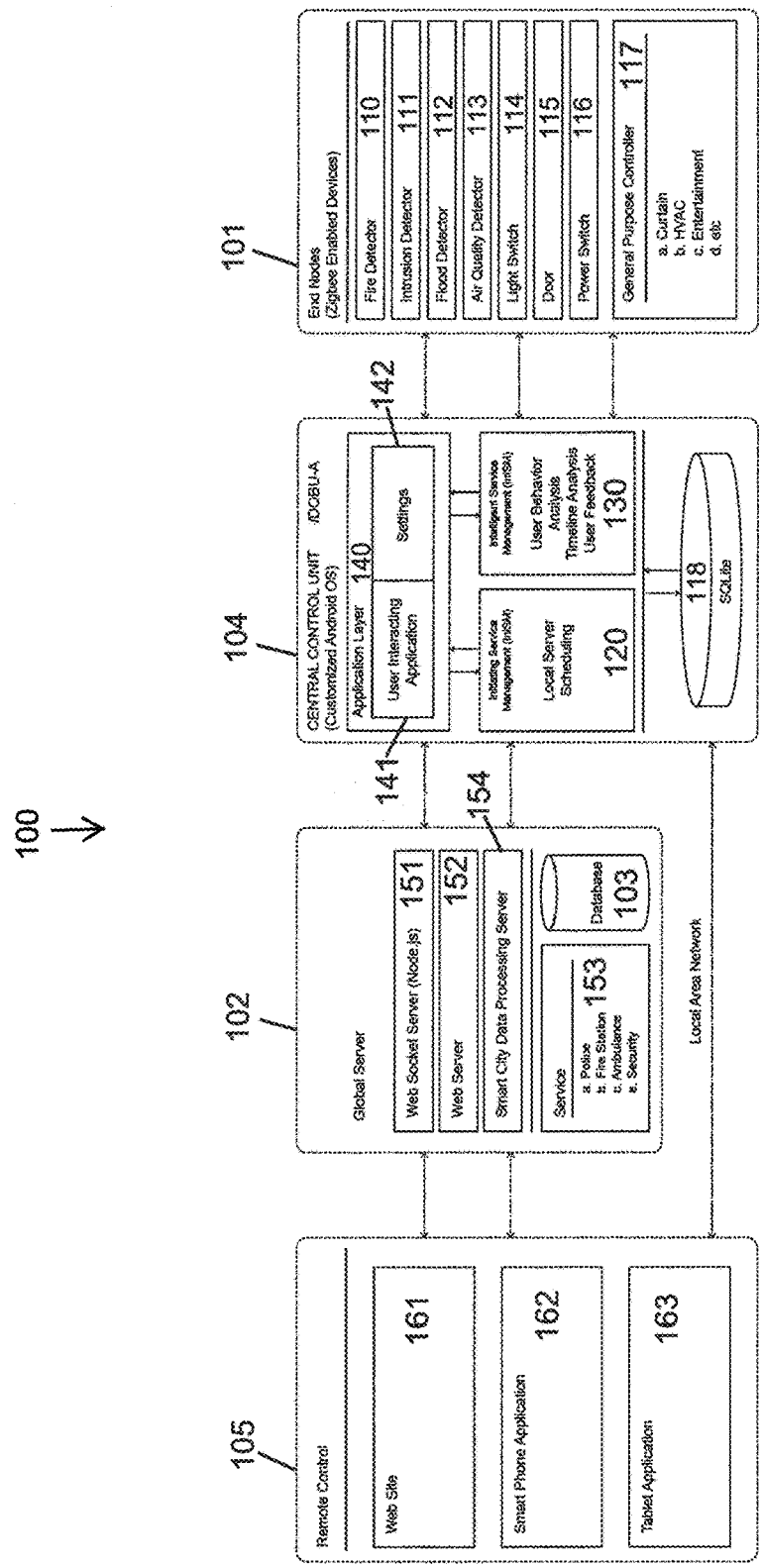
FIG. 1 is an overall schematic of the system showing the user end nodes, global server including database, CCU, and user remote control.

As shown in FIG. 1, the home automation system 100 of the invention includes Zigbee enabled user end nodes 101, a global server 102 including a database 103, a central control unit (aka Dobu) 104, and user remote control 105. The end user nodes 101 include a plurality of sensor systems 110-116 and general purpose controller 117 that provide data to a database SQLite 118 and are controlled by central control unit (CCU) 104 that implements software applications including Initiating Service Management 120 and Intelligent Service Management 130, as will be described in more detail below. The CCU 104 also includes an application layer 140 including a user interacting application 141 and settings 142 as also described in more detail below. User interacting application 141 communicates with global server 102 preferably via an Internet (e.g. Wi-Fi) connection. In the illustrated embodiment, global server 102 includes a web socket server 151, a web server 152, and a service center for managing communications with police, fire, ambulance, security, and other services 153. Also, in a smart city environment as will be discussed below, a smart city data processing server 154 may also be provided. Finally, the remote control 105 may communicate with the CCU 104 via a LAN or with the global server 102 over an internet connection. Remote control 105 may be provided via a web site 161, smart phone application 162, and/or tablet application 163 as indicated.

End Nodes

The end nodes 101 include a plurality of detectors such as fire detector 110, intrusion detector 111, flood detector 112, air quality detector 113, light switch control nodes 114, door lock control nodes 115, and power switch 116, as well as other desirable detectors (not shown) that are controlled by a general purpose controller 117. Exemplary detectors include at least the following.

Fire Detector (Coupled) 110

A false fire alarm might be given from conventional smoke detectors due to various harmless smoke sources such as cooking in the kitchen, incense, smoking, etc. The invention is focused on increasing the reliability of alarms by combining two sensors, smoke and temperature, into one detector 110. Two sensors and a microcontroller are packed in a detector case that provides compactness. Having the microcontroller makes this detector more than a detector. It can also analyze data coming from the sensors. Moreover, fire detector 110 functions in several energy saving modes particularly including four different modes: smoke detection, temperature increase detection, smoke sensor lead-in coupled detection, and temperature sensor lead-in coupled detection. As a result, a single AA sized 3.7V battery can power the detector up to 3 years.

Intrusion Detector (Coupled) 111

Generally, an intrusion is detected by either a motion detector equipped with a passive infrared (PIR) sensor or glass break sensor designed for detecting sounds emanating from breaking glass. However, the methods sometimes generate false alarms from random motions or environmental effects, such as undulating curtain, flying object in a field of view of the sensor where window is opened, and even sometimes electromagnetic noise etc. In accordance with the invention, a coupled intrusion detector 111 incorporates two sensors, motion and sound, and a microcontroller into a single unit. With the help of the microcontroller employing a unique algorithm, the intrusion detector 111 is able to distinguish different objects, namely humans, children and adults alike, from animals or inanimate objects. Thus, the probability of a false alarm is significantly reduced.

Also, the intrusion detector 111 functions in three modes: PIR sensor only; sound sensor only; and combination of both.

Flood Detector (Coupled) 112

Flooding is one of the most common household accidents. In an exemplary embodiment, flood detector 112 includes a water activated sensing electrode and a microcontroller. If water leakage is sensed by the sensing electrode, the microcontroller is capable of alerting the CCU 104 which subsequently alarms the user. The flood detector 112 has water proof design since it may be exposed to a prolonged humid environment.

Total Air Quality Detector 113

Total air quality detector 113 combines the sensors for carbon dioxide and TVOC, dust particles, temperature and humidity, and ambient light into a single unit. Total air quality detector 113 is capable of providing total air quality information to CCU 104 and the user. The total air quality detector 113 operates in sampling mode where measurements take place in some time intervals. However, the user can request the reading of any sensor at any time. Total air quality information is not only important for that moment in time, also it plays an important role in smart learning by CCU 104 (described below).

Light Switch Control 114

Turning on/off a light is probably the most frequent action a person does while in the house. Therefore, it is highly desirable to have this action remotely controlled and, better yet, automated. In Dobu, this goal is achieved via light switch control 114. Light switch control 114 includes a Zigbee enabled microcontroller that offers the user the capability of remote switching and dimming of a light.

Door Lock Control 115

Dobu provides the convenience of locking/unlocking a door remotely via its door lock control 115. Door lock control 115 includes a Zigbee enabled microcontroller that is connected to an electromechanical lock. The microcontroller also communicates with CCU 104 offering the user the ability to control the lock remotely via the user access platform.

Power Switch Control 116

Dobu power switch control 116 enables the user to control any electrical power line to which it is connected. Power switch control 116 includes a Zigbee enabled microcontroller that receives and transmits a signal to and from CCU 104 to enable the user to control the electrical power line via the user access platform.

General Purpose Zigbee Controller 117

Remote control of household appliances is always a desire for homeowners since such an option makes life more comfortable. For this reason, a general purpose controller 117 controls HVAC and other third party electronic devices that are part of the extended home automation system. For example, the controller 117 is capable of communicating with appliances featuring common standard protocols such as CAN, LIN, RS485, etc. Such devices include entertainment systems, curtain controls, and the like.

Central Control Unit 104

For home automation systems, it is common to have a central hub that acts as a connector between the end user and the system and its components. In the home automation system of the invention, CCU 104 is responsible for such communications as well as for processing data and performing complex computations in response to these data at the user's discretion or independent of the user. Particularly, CCU 104 includes at least the following features that are described in more detail below: a) a high performance microprocessor capable of stand-alone computing for managing the home automation features; b) a combination antenna for at least 3 different wireless communication protocols; and c) a method for resetting the system.

In exemplary embodiments, CCU 104 is capable of complex calculations since it is equipped with a high performance microprocessor designed for mobile devices, namely an ARM-based System-on-a-Chip. This kind of microprocessor features high frequency clock speed and multiple cores. These properties enable a device to multi-task and to be extremely efficient despite complex tasks assigned to it. Integrating this kind of microprocessor into the CCU 104 allows it to become a smart device rather than a simple controller. This approach enables a next level in the technology of home automation systems to be achieved.

In operation, CCU 104 communicates with the end nodes 101 for monitoring for an event and makes a corresponding decision for further actions if there is an event. At the same time, the CCU 104 allows the user to request information from a particular detector or dictate a working mode of the detectors. In this fashion, CCU 104 provides automation with flexibility for user desires.

In exemplary embodiments, CCU 104 utilizes 4 different communication protocols: Wi-Fi, Bluetooth, Zigbee, and cellular network. Zigbee is used for communication between the CCU 104 and the end nodes 101 of the system 100, and particularly for determining the most power efficient operational mode of the end nodes 101. Wi-Fi, Bluetooth, and cellular network protocols are utilized for communication between the user and the CCU 104. The CCU 104 is equipped with two antennas that can handle all four protocols. For example, as described below with respect to FIGS. 2 and 3, one antenna may be used for Wi-Fi, Bluetooth, and Zigbee communications, while the other antenna may be a rather standard antenna for cellular network based communication. Those skilled in the art will appreciate that placing four separate antennas in one device case is a difficult task, especially in a device that provides a limited space for antennas, not to mention interference effects between antennas or from them. Furthermore, the back cover is made of aluminum alloy so the antennas need to be placed in the front and around the screen.

In exemplary embodiments, the invention further features a method to hard-reset a device with a two-button combination. This resetting is at hardware level, thus it is a completely hardware based solution. There is no software element involved in this resetting. Since it is a hardware based solution, failure to reset the device is unlikely to happen, with the exception being the existence of physically damaged, nonfunctioning buttons.

In exemplary embodiments, CCU 104 runs a customized Android operating system called Dobu-A. This operating system is specifically designed for home automation systems, particularly for the Dobu system described herein. Having a customized OS increases the efficiency of CCU 104 by maximizing its computational power via parallel computing. Particularly, CCU 104 is tasked with storing all information and events, and analyzing the data as required by Dobu-A. More particularly, smart learning which requires highly complex data analysis is performed on CCU 104, as will be described in more detail below.

Figure 2:
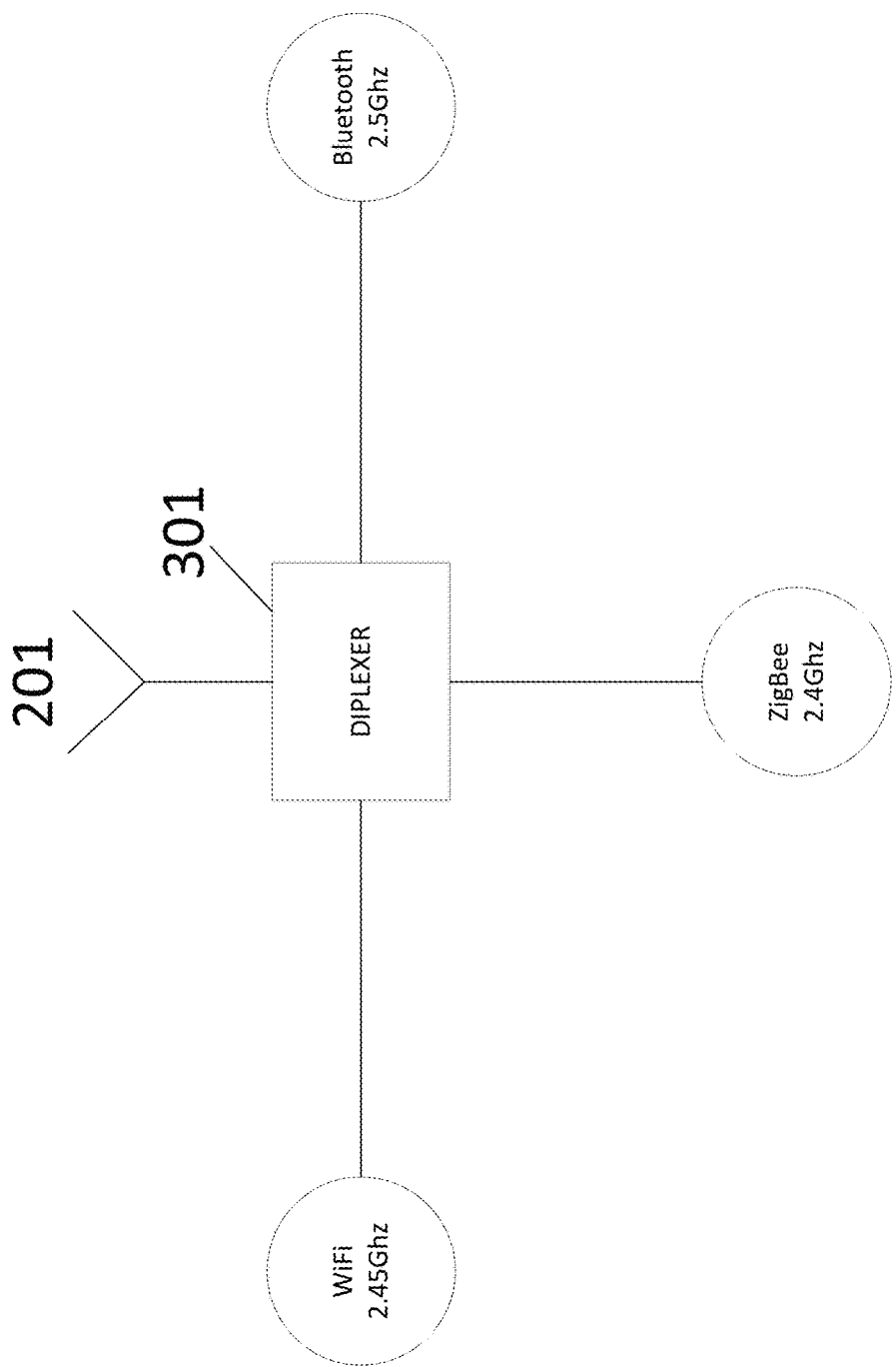
FIG. 2 illustrates three different communication protocols which the antenna can handle for wireless communications.

FIG. 2 shows the antenna design of an exemplary embodiment. Based on the proximity of operating frequencies for Zigbee at 2.4 GHz, Wi-Fi at 2.45 GHz, and Bluetooth at 2.5 GHz, a universal antenna 201 is provided for these communications. Antenna 201 is designed to transmit and receive three different signals at 2.4-2.5 GHz via diplexer 301.

Figure 3:
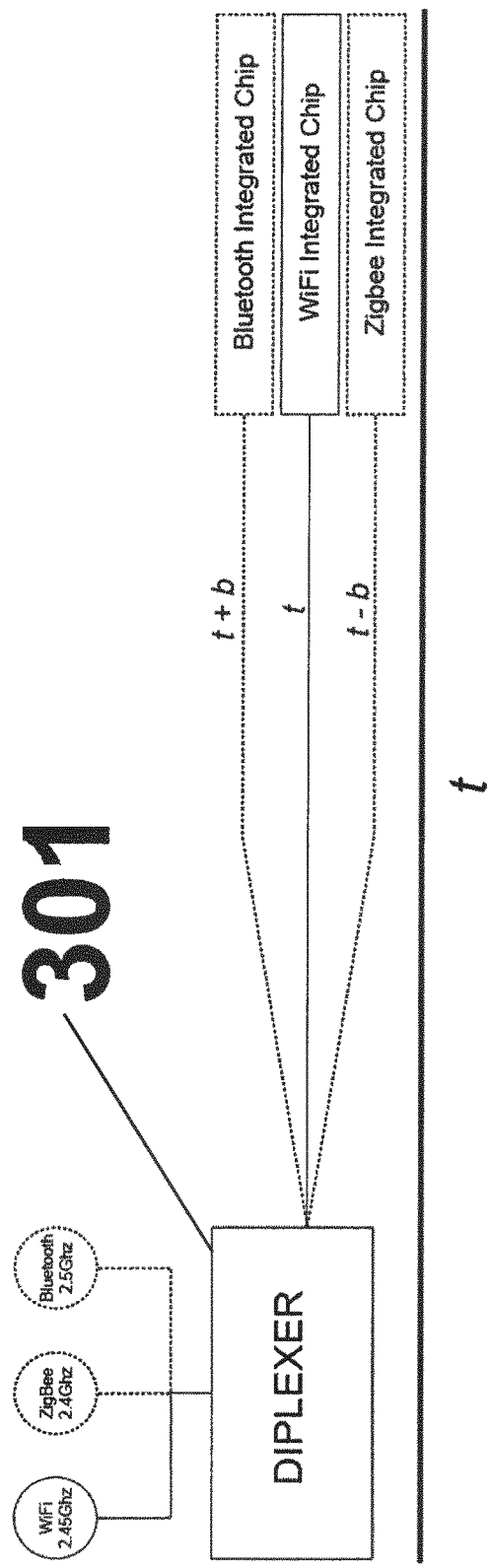
FIG. 3 is a schematic of the modulation method of the antenna illustrating three different frequency signals that may be received/transmitted using frequency modulation.

FIG. 3 shows a modulation method that enables antenna 201 do the aforementioned tasks. At the core of the method is modulation circuit (diplexer) 301 that is used to distinguish the three signals, filter, and route them. In another words, modulation component 301 is a clearinghouse for Zigbee, Wi-Fi, and Bluetooth. Modulation circuit 301 provides Wi-Fi modulation at t=2.45 GHz, Bluetooth modulation at t+b=2.5 GHz, where b=0.05 GHz, and Zigbee modulation at t−b=2.4 GHz as shown.

The two button combination reset is initiated by simultaneously pressing the home and power buttons. CCU 104 is released from any system failure via this method as it is a hardware based reset as opposed to a software solution. This feature overrides any operation of the system as it cuts the system power off. Therefore, this method is a most trustworthy solution for resetting.

Figure 4:
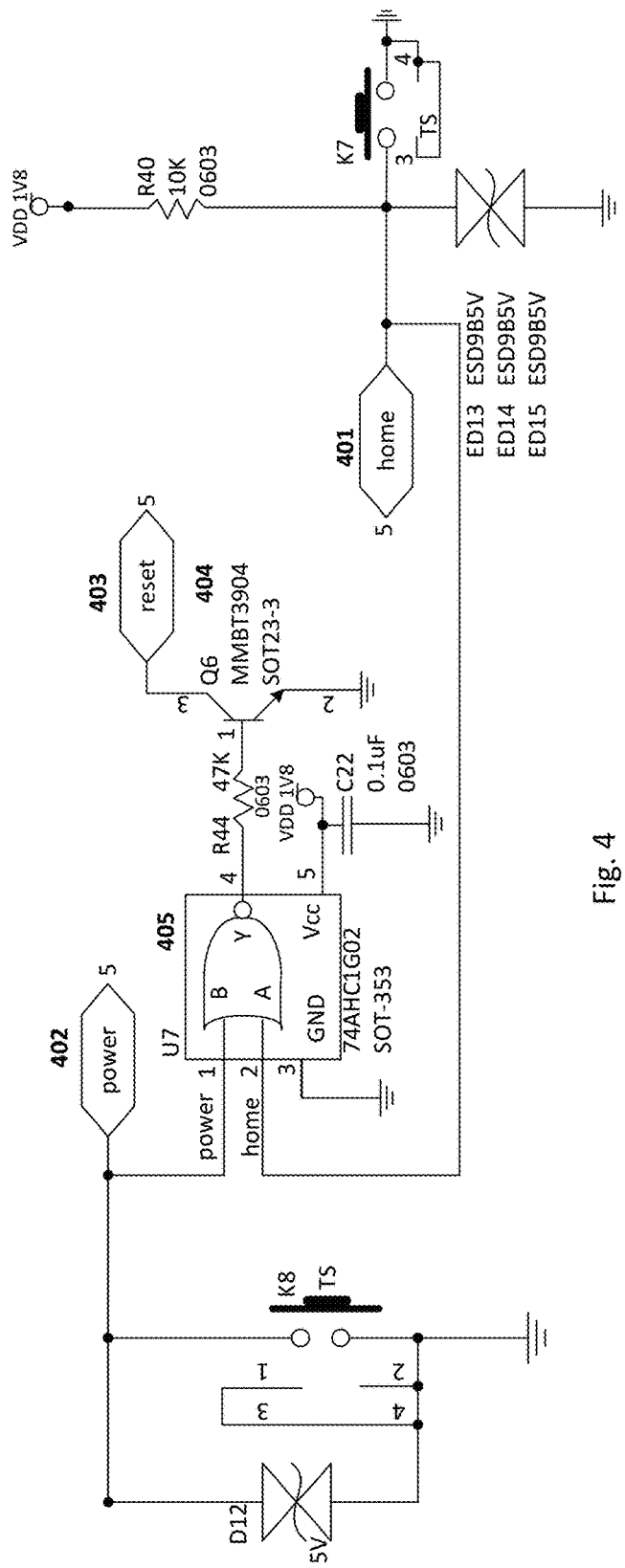
FIG. 4 is a schematic of a resetting circuit.

The resetting circuit schematic is shown in FIG. 4. Specifically, a resetting circuit's inputs are connected to home 401 and power 402 buttons, while its output is connected to the reset 403 of the power chip. The resetting circuit includes a transistor 404 and a NOR logic element 405. In general, when two inputs of NOR 405 are in logic low level, the output becomes logic high level. As soon as user presses down home 401 and power 402 buttons simultaneously, the NOR inputs become logic low levels, and subsequently, a transistor base is powered by the NOR 405 output which is at a high level. Once the transistor 404 activates reset 403 of the power chip, it turns off all power to the system and resets it. The power chip re-supplies the power, instantly, to the system to finish the resetting process.

The detection circuits as controlled by the CCU 104 will now be described with respect to FIGS. 5-23.

Fire Detection

Figure 5:
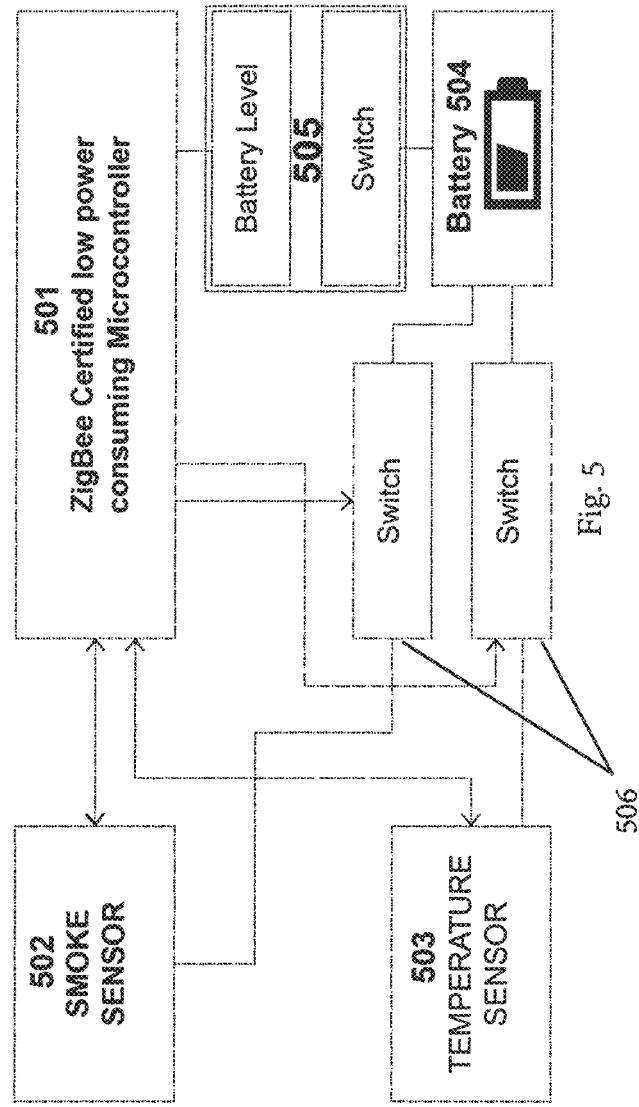
FIG. 5 is a simplified schematic of a fire detector including a smoke sensor, temperature sensor, Zigbee certified microcontroller, switches, battery level monitor, and battery.

The overall schematic of fire detector 110 is shown in FIG. 5. As shown, fire detector 110 includes a Zigbee transceiver microcontroller 501, a smoke sensor 502, a temperature sensor 503, a battery 504, a battery level monitor 505, and switches 506. Low power consumption is emphasized as fire detector 110 is wireless and powered by battery 504. Therefore, minimal power consumption was a factor in selecting hardware components and designing fire detector 110's operation.

For example, microcontroller 501 performs the following functions to conserve battery 504:
  powers different parts of detector 110, either the Zigbee transceiver, sensors, or battery level monitor, selectively;
  operates in a sleep mode with timer settings.

Smoke sensor 502 includes an Infrared-Light emitting diode (IR-LED) and a photovoltaic transistor. It operates on passive principles as the transistor opens only when a sensing compartment is filled with smoke causing a change in the light diffraction within it. Output voltage is converted into a digital signal by an ultra-low power consuming comparator prior to the output voltage being sent to microcontroller 501.

Temperature sensor 503 is a chip with an IIC interface. The chip uses low current that does not exceed 60 nA.

Both sensors can operate in standby mode to save energy, and are activated by microcontroller 501 by selectively activating the switches. Moreover, a built-in battery level monitor 505 is powered only during the measurement by battery level monitor 505 to conserve battery 504.

Principle of Operation and Modes

Since the sensors (502 and 503) are selectively powered, fire detector 110 is able to operate in several modes where different sensors or combinations thereof are active. However, it keeps only one sensor active under a normal operating mode. Available modes include:
  "smoke sensor only"
  "temperature sensor only"
  "smoke sensor lead-in coupled"
  "temperature sensor lead-in coupled"

In all modes, an initial detection is carried out by a single sensor even in the coupled modes.

Figure 6:
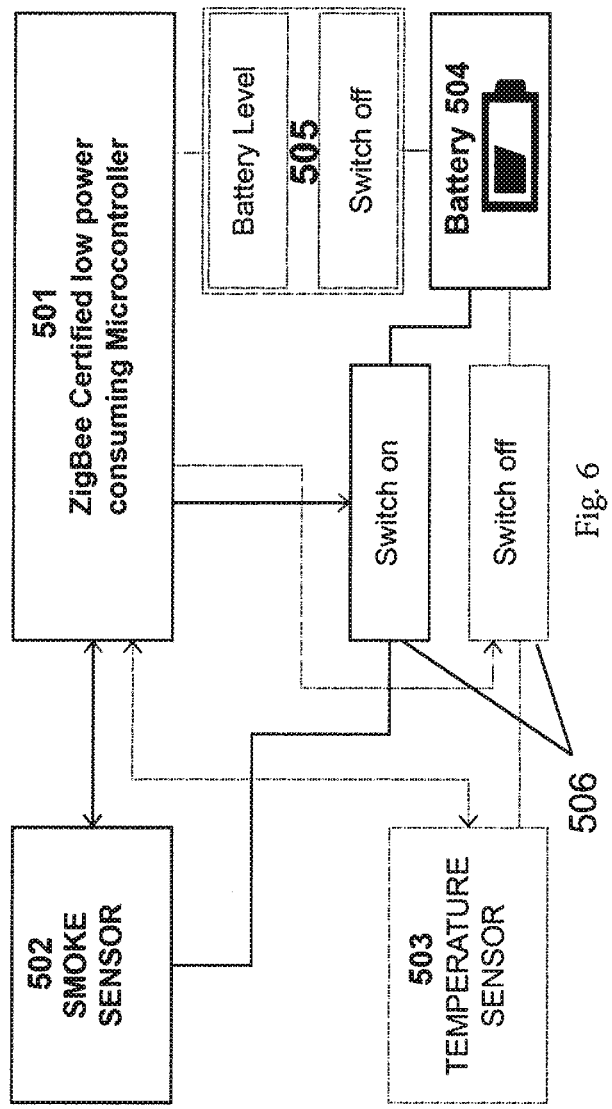
FIG. 6 is a schematic of the fire detector of FIG. 5 operating in "smoke sensor only" mode.

FIG. 6 shows an operational diagram of an active smoke sensor 502. In "smoke sensor only" mode, only smoke is monitored by active smoke sensor 502 while temperature sensor 503 stays unpowered and inactive. In FIG. 6, the bold arrowed lines indicate the active elements in this mode.

Figure 7:
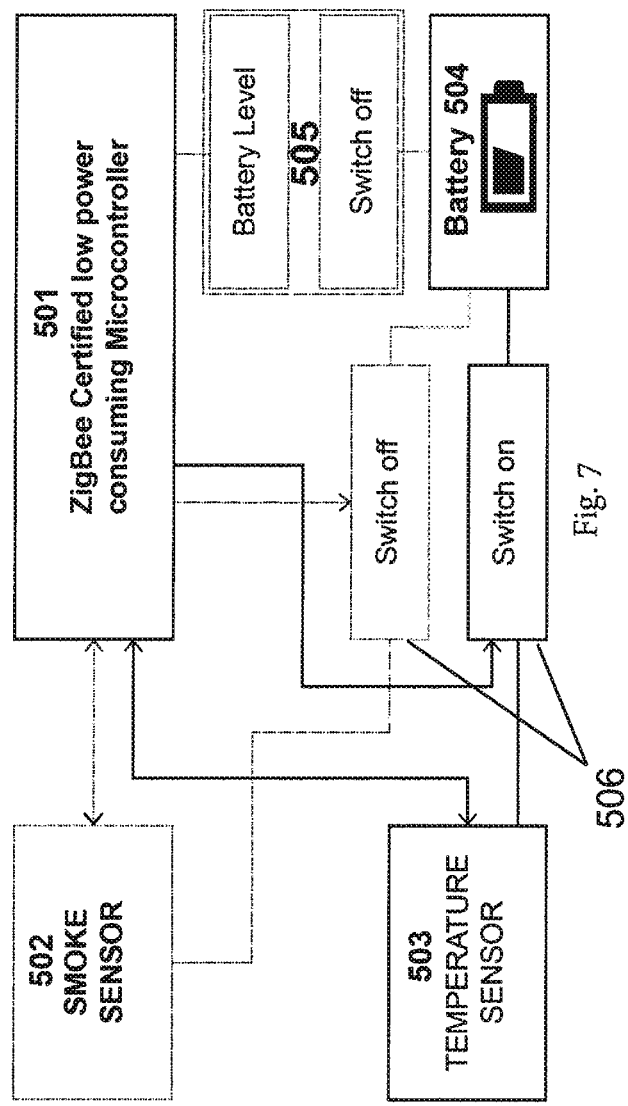
FIG. 7 is a schematic of the fire detector of FIG. 5 operating in "temperature sensor only" mode.

FIG. 7 shows an operational diagram of active temperature sensor 503. In "temperature sensor only" mode, only a temperature increase is monitored by active temperature sensor 503 while smoke sensor 502 stays unpowered and inactive. In FIG. 7, the bold arrowed lines indicate the active elements in this mode.

In single sensor modes, microcontroller 501 alerts CCU 104 in the case of an event detection by the sensor, either 502 or 503, and waits for further instructions from CCU 104 (either from CCU 104 directly or from the user via CCU 104).

In coupled modes, the lead-in sensors monitor continuously until an event is detected. For example, in "smoke sensor lead-in coupled" mode, smoke sensor 502 is initially active as shown in FIG. 6. Once smoke is detected, microcontroller 501 activates temperature sensor 503 by activating the switch, and monitors the situation continuously with both sensors. Meanwhile, microcontroller 501 sends the information about the detection to CCU 104. If both sensors detect an event, i.e. smoke and temperature are both detected, microcontroller 501 alerts CCU 104. In this case, the event is considered to be a fire hazard and CCU 104 enters an emergency mode. In the emergency mode, CCU 104 sends an alarm to the user. In this way, a chance of false alarm is reduced and the battery is conserved.

In "temperature sensor lead-in coupled" mode, temperature sensor 503 leads instead of smoke sensor 502.

The user can set fire detector 110 to any operational mode. Default operating mode of fire detector 110 is "smoke sensor lead-in coupled" mode in an exemplary embodiment.

Figure 8:
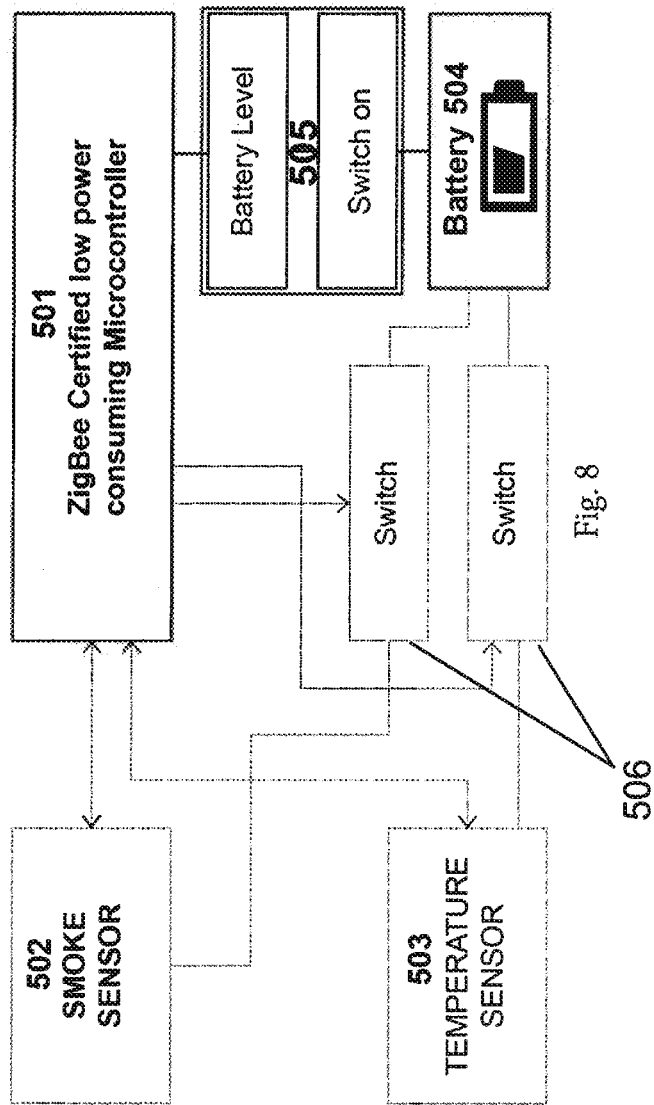
FIG. 8 is a schematic of the fire detector of FIG. 5 with the active battery level monitor powered and active.

FIG. 8 shows an operational diagram of battery level monitor 505. During battery level measurement, microcontroller 501 turns the battery level monitor's switch on to power the monitor 505. In FIG. 8, the active elements in this mode are indicated in bold.

The CCU Communication

In general, microcontroller 501 of fire detector 110 sends 3 different types of alerts to CCU 104. These are shown in Table 1.

TABLE 1

Detected events and the corresponding alert types for fire detector

| Alerts | Detected events |
|---|---|
| Type 1 | Smoke is detected |
| Type 2 | Temperature increase is detected |
| Type 3 | Both Smoke and temperature increase are detected |

Once CCU 104 receives an alert from fire detector 110, it also takes an action depending on the specifics of the alert. Correlation between the alert and the corresponding actions that CCU 104 takes are shown in Table 2.

In all modes, an initial detection is carried out by a single sensor. In single sensor modes, only level 1 or 2 alert, along with the appropriate recommended action, is sent to the user by CCU 104. For example, if smoke is detected in "smoke sensor only" mode, CCU 104 notifies the user and recommends a check for temperature sensor 503 readings. Since fire detector 110 is operating in single sensor (smoke) 502 mode, it cannot override its operational mode and check temperature sensor 503, instead the user has to request the reading. "Temperature sensor only" mode operates vice-versa.

However, in the coupled modes, microcontroller 501 automatically powers the second sensor if the first one detects a positive signal. If both sensors detect positive signals, microcontroller 501 of fire detector 110 sends out Level 3 alert to CCU 104, which consequently alarms the user of a very likely fire hazard.

Moreover, there is a built-in battery level monitor 905. The monitor is powered by microcontroller 901 only during the measurement by battery level monitor 905 to conserve the battery 904.

Principle of Operation and Modes

The intrusion detector 111 operates in the following modes:
"sound sensor only"—only sound sensor is active;
"motion sensor only" only motion sensor is active via the comparator 906;
"object size estimating"—motion sensor is active via the ADC 907; and
"coupled"—i.e. both sensors are active.

Figure 10:
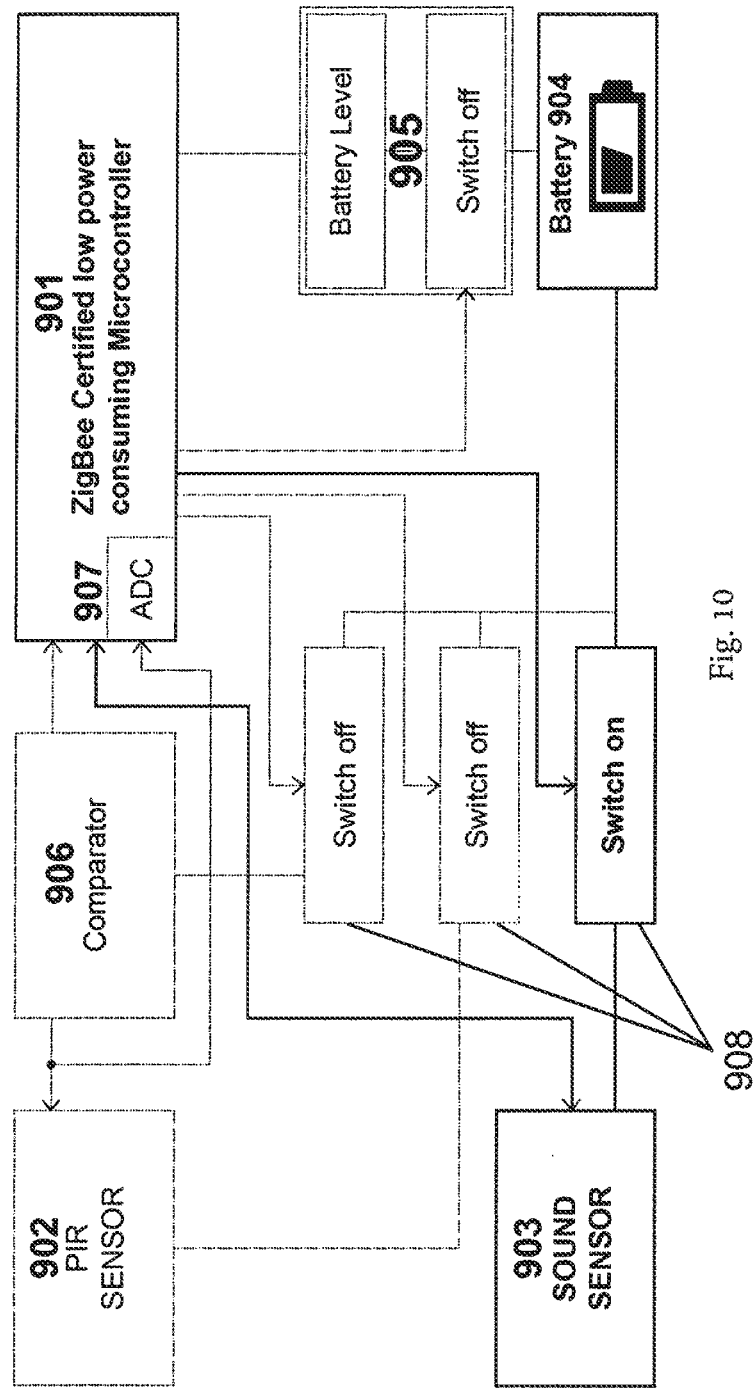
FIG. 10 is a schematic of the intrusion detector of FIG. 9 operating in "sound sensor only" mode.

FIG. 10 shows an operational diagram for active sound sensor 903. Here, only sound sensor 903 is active and powered by battery 904 while motion sensor 902 remains unpowered and inactive. This diagram is valid for "sound

TABLE 2

CCU-to-user alerts and recommendations to user for fire detector

| | Single sensor modes | | Combined modes | |
|---|---|---|---|---|
| | Smoke sensor only | Temperature sensor only | Smoke sensor lead-in | Temperature sensor lead-in |
| Smoke presence | Type 1 alert; Recommendation to check the temperature readings | — | Type 1 alert; Recommendation to check the temperature readings | Type 3 alert Emergency mode |
| Temperature increase | — | Type 2 alert; Recommendation to check for smoke | Type 3 alert Emergency mode | Type 2 alert; Recommendation to check for smoke |

Intrusion Detection

Figure 9:
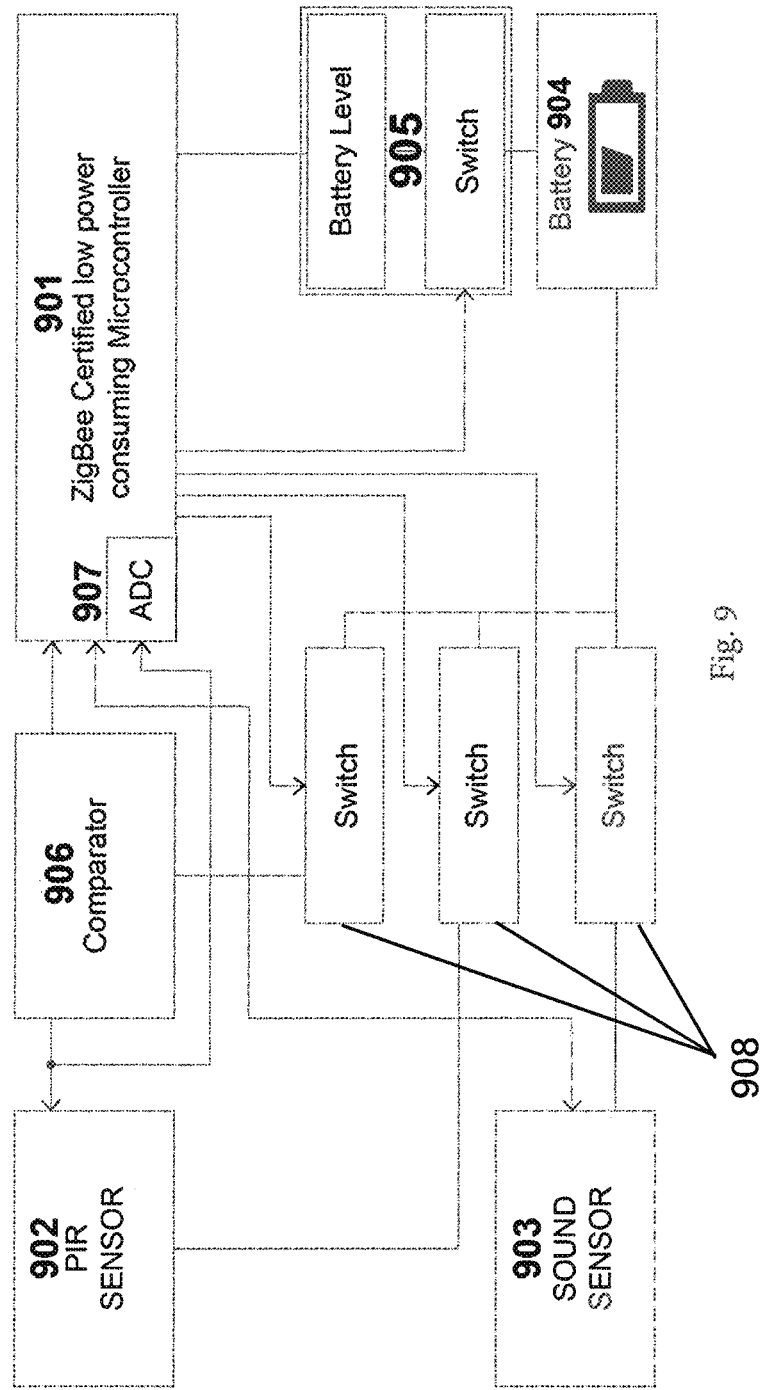
FIG. 9 is a simplified schematic of an intrusion detector including a passive infrared (PIR) motion sensor, sound sensor, comparator, analog to digital convertor (ADC), Zigbee certified microcontroller, switches, battery level monitor, and battery.

FIG. 9 shows an overall schematic of the intrusion detector 111. As mentioned previously, intrusion detector 111 includes a Zigbee transceiver microcontroller 901, a Passive infrared (PIR) motion sensor 902, a sound sensor 903, a comparator 906, an analog-to-digital convertor (ADC) 907, a battery 904, a battery level monitor 905, and switches 908. Low power consumption is again emphasized as the intrusion detector 111 is wireless, and powered by a battery 904. Therefore, minimal power consumption was a factor in selecting hardware components and designing intrusion detector 111's operation. Specifically, comparator 906 for a PIR sensor 902 output, and an amplifier for sound sensor 903 use ultra-low energy to operate. The sensors 902 and 903 are powered separately in a selective manner.

As mentioned above, low power consumption is emphasized. As a result, microcontroller 901 performs the following functions to conserve the battery 904:
powers different parts of intrusion detector 111, either the Zigbee transceiver 901, sensors 902 and 903, or battery level monitor 905, selectively;
operates in sleep mode with timer settings; and
dynamically adjusts its sleep timer based on user behavior.

An output signal from PIR 902 is processed in two different ways: via comparator 906 or ADC 907. When the signal is processed via comparator 906, as it is done usually, a threshold for signal level is used to identify objects above some predetermined size. On the other hand, when ADC 907 is used for signal processing, it is possible to estimate the object's size. Energy-wise, comparator 906 is powered separately from PIR sensor 902 so that it is not consuming energy if the PIR 902 signal is processed by ADC 907.

sensor only" mode. In FIG. 10, the bold arrowed lines indicate the active elements in this mode.

Figure 11:
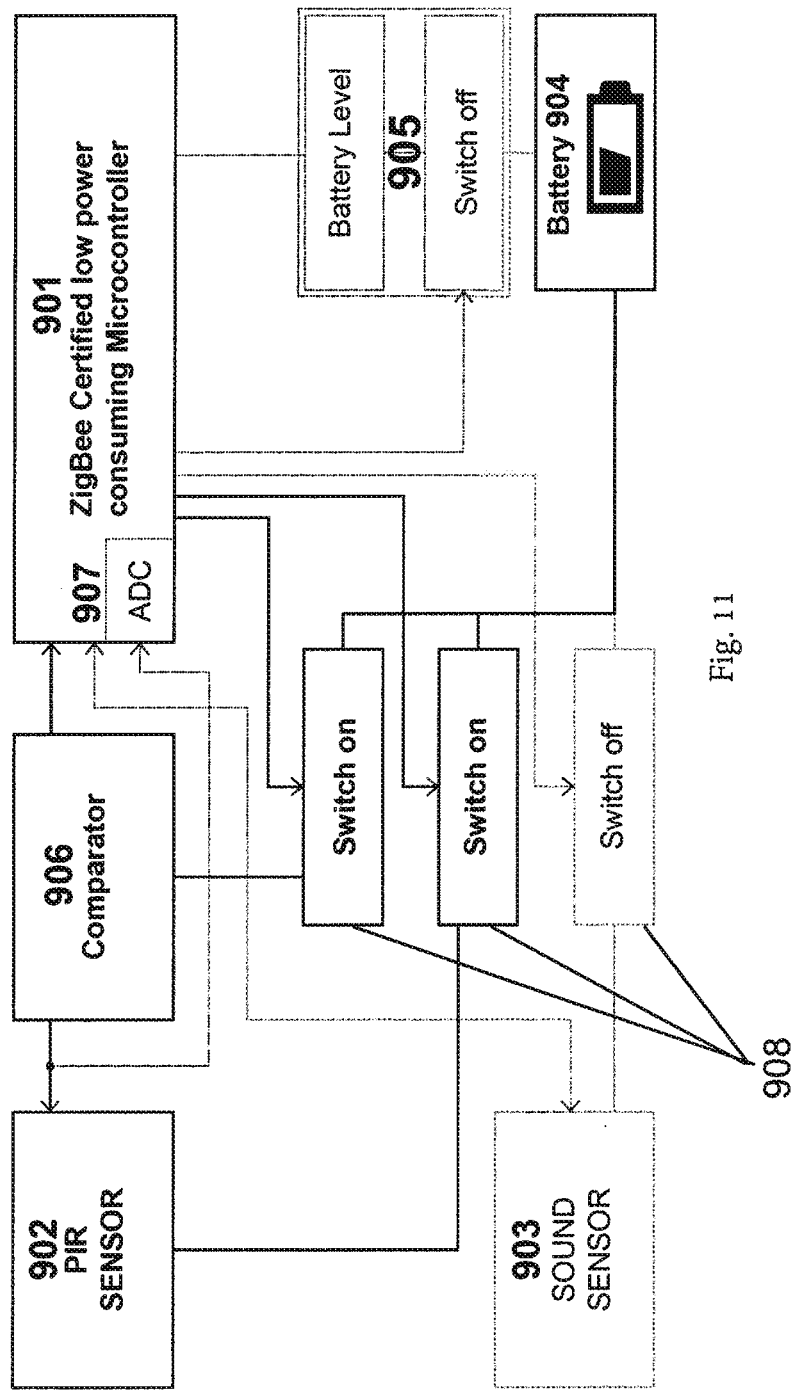
FIG. 11 is a schematic of the intrusion detector of FIG. 9 operating in "motion sensor only" mode via the comparator.

FIG. 11 shows an operational diagram for active motion sensor 902 operating with comparator 906. Herein, the signal from motion sensor 902 is directed to comparator 906 and ADC 907 is disconnected from battery 904. This is how "motion sensor only" mode works. In FIG. 11, the bold arrowed lines indicate the active elements in this mode.

Figure 12:
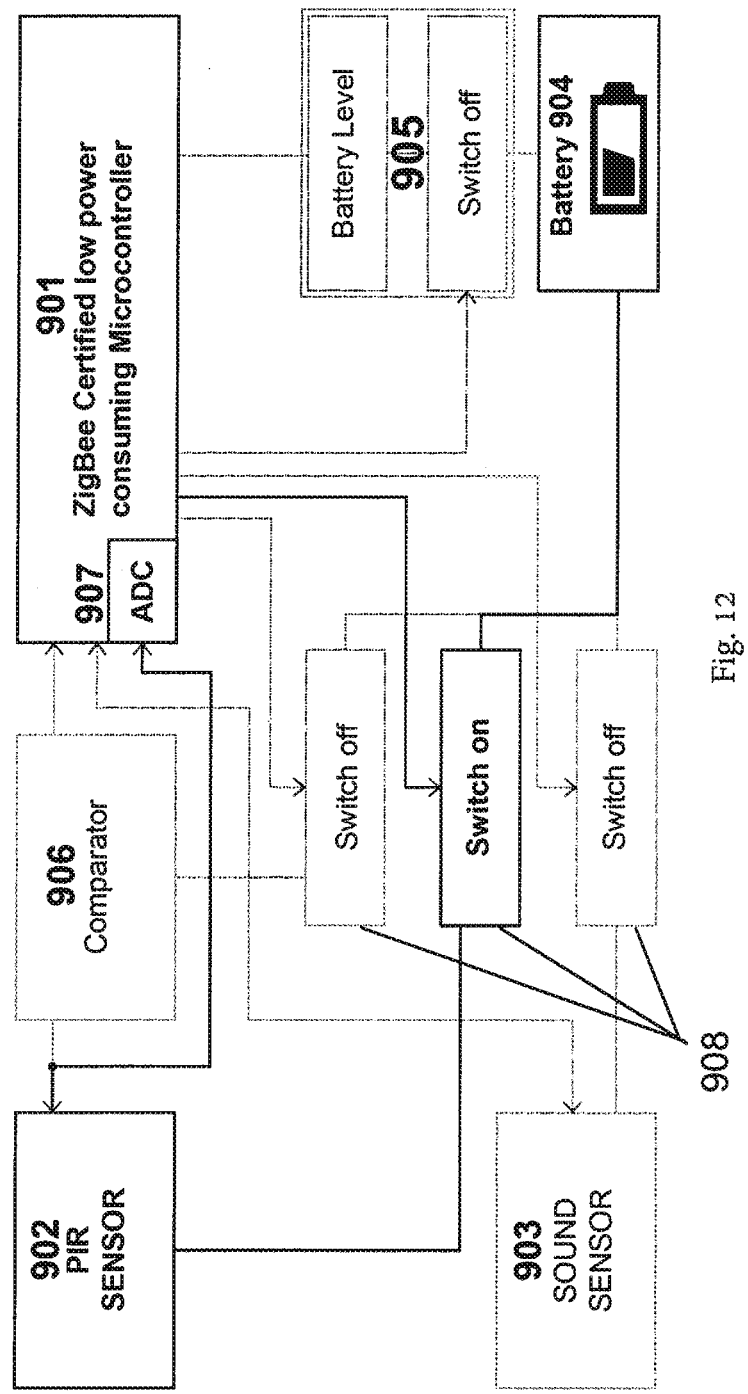
FIG. 12 is a schematic of the intrusion detector of FIG. 9 operating in "object size estimating" mode.

FIG. 12 shows an operational diagram of the motion sensor operating with ADC 907. In FIG. 12, the bold arrowed lines indicate the active elements in this mode. Herein, the PIR 902 output is connected to ADC 907 while comparator 906 is disconnected from battery 904. In this mode, intrusion detector 111 is capable of estimating size of the detected object. Objects size is estimated at 3 levels as shown in Table 3.

TABLE 3

Object size classifications of the intrusion detector 111.

| Size classification | Possible causes |
|---|---|
| Small sized object | Insects, mouse, rat, etc.. |
| Middle sized object | Pets like cat and dog, child, etc.. |
| Large sized object | Adult human |

In single sensor modes, microcontroller 901 alerts CCU 104 in the case of event detection by the active sensor, and waits for further instructions from the user via CCU 104. In the coupled mode, both sound sensor 903 and motion sensor 902 operating via comparator 907 are active and monitor the situation continuously. It is the default mode until the user sets the intrusion detector 111 to a different operational mode.

Figure 13:
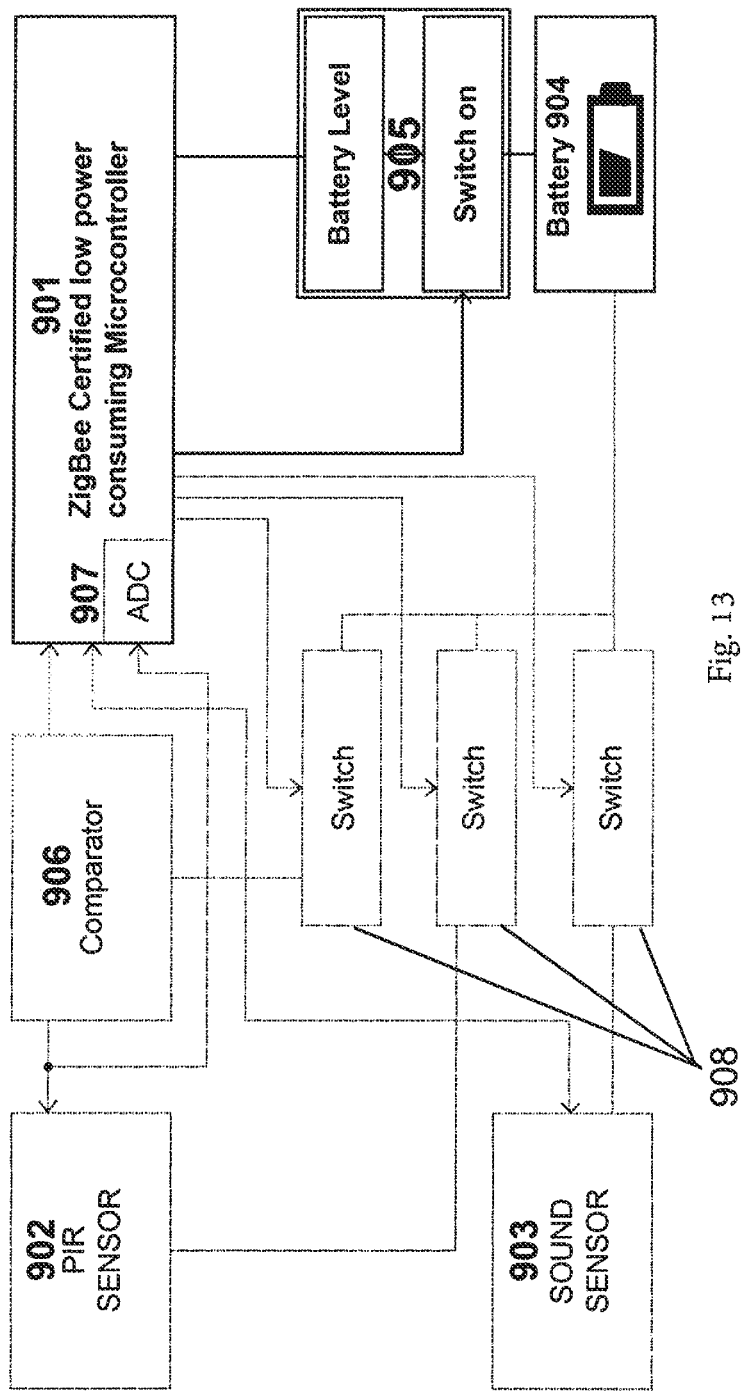
FIG. 13 is a schematic of the intrusion detector of FIG. 9 with the active battery level monitor powered and active.

FIG. 13 shows an operational diagram of battery level monitor 905. In FIG. 13, the active elements in this mode are indicated in bold.

CCU Communication

In general, microcontroller 901 of the intrusion detector 111 sends 3 different types of alerts to CCU 104. These are shown in Table 4.

TABLE 4

Detected events and the corresponding alert types for intrusion detector 111

| Alerts | Detected events |
|---|---|
| Type 1 | Sound is detected |
| Type 2 | Motion is detected |
| Type 3 | Both sound and motion are detected |

Depending on the alert it receives from intrusion detector 111, CCU 104 takes action, such as sending out an alarm to the user. Correlation between alerts and corresponding actions that CCU 104 takes are shown in Table 5.

TABLE 5

CCU-to-user alerts and recommendations to user for intrusion detector 111

| | Only-sensor modes | | | |
|---|---|---|---|---|
| | Motion detector mode | Sound detector mode | Coupled mode | Object size detection mode |
| Sound detected | — | Type 1 alert; Recommendation to switch into combination mode | Type 1 alert if sound only; Type 2 alert if motion only; Type 3 alert and emergency mode if both are detected | — |
| Motion detected | Type 2 alert; Recommendation to switch into combination mode | — | | Type 2 alert; Object size info |

In single sensor modes, microcontroller 901 sends an alert about any positive detection to CCU 104. Subsequently, CCU 104 sends a notification to the user and requests microcontroller 901 to switch the intrusion detector 111 into coupled operational mode.

In the object size estimating mode, microcontroller 901 estimates the object's size by utilizing its program, and transmits this information to CCU 104. In turn, CCU 104 alarms the user of the detected motion and the object's size.

In the coupled mode, detection by either sensor initiates alert transmission by microcontroller 901 to CCU 104. However, CCU 104 does not enter into the emergency mode until it receives alerts from both sensors simultaneously. If both motion and sound are detected, CCU 104 enters emergency mode and alarms the user of a very likely intrusion event. Here, a chance of false alarm is reduced as any event is required to be confirmed by both sensors.

Flood Detection

Figure 14:
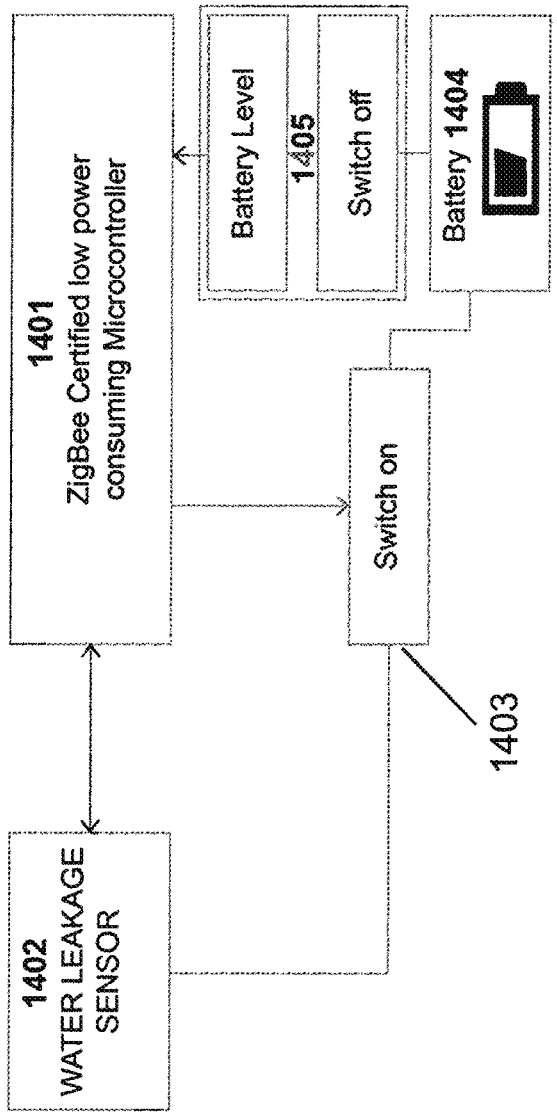
FIG. 14 is a simplified schematic of a flood detector including a water leakage sensor (i.e. water activated sensing electrode), Zigbee certified microcontroller, switches, battery level monitor, and battery.

FIG. 14 shows an overall schematic of the flood detector 112. As shown in FIG. 14, flood detector 112 includes Zigbee transceiver microcontroller 1401, water leakage sensor (i.e. water activated sensing electrode) 1402, a battery level monitor 1405, a battery 1404, and switches 1403. Low power consumption was emphasized in design as flood detector 112 is wireless, and powered by battery 1404. Therefore, minimal power consumption was a factor in selecting hardware components and designing flood detector 112. Water leakage sensor 1402 is normally a part of an open circuit.

Particularly, microcontroller 1401 performs the following functions to conserve battery power:
the water leakage sensor or the battery monitor is powered during an event or a measurement;
operates in sleep mode with timer settings; and
dynamically adjusts sleep timer based on user behavior.
Moreover, there is a built-in battery level monitor 1405. Monitor 1405 is powered only during the measurement to conserve battery 1404.

Principle of Operation and Modes

Detector 112 operates in only one mode where the water leakage sensor is "active" in an open circuit.

Figure 15:
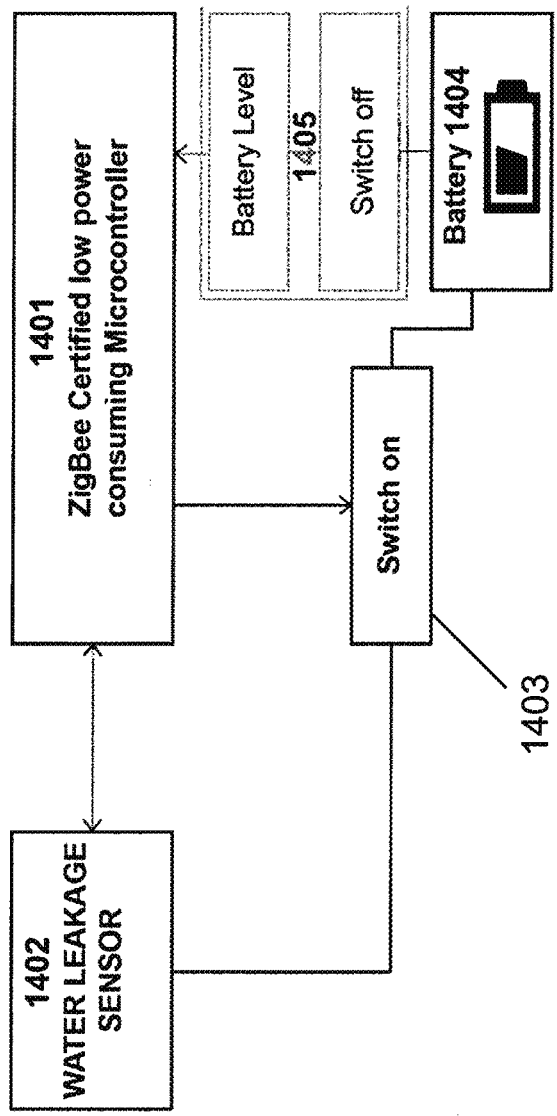
FIG. 15 is an operational schematic of the flood detector of FIG. 14.

FIG. 15 shows an operational diagram of flood detector 112. In FIG. 15, the bold arrowed lines indicate the active elements in this mode. The water leakage sensor 1402 is connected to battery 1404 by the switch 1403. When water presence completes a monitoring circuit of sensing electrode 1402, the microcontroller 1401 receives the information and alerts CCU 104.

Figure 16:
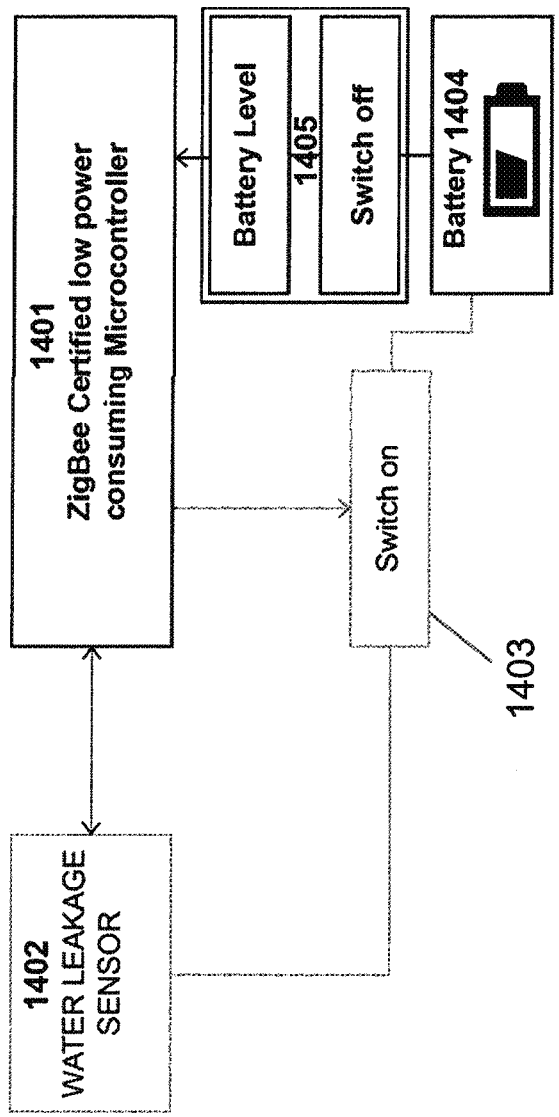
FIG. 16 is a schematic of the flood detector of FIG. 14 with the active battery level monitor powered and active.

FIG. 16 shows flow diagram for the active mode for the battery level monitor 1405. In FIG. 16, the active elements in this mode are indicated in bold.

CCU Communication

In general, microcontroller 1401 of flood detector 112 transmits only one alert as shown in Table 6.

TABLE 6

Detected events and the corresponding alert types for flood detector

| Alert types | Detected Events |
|---|---|
| Type 1 | Water leakage is detected |

Once CCU 104 receives an alert from microcontroller 1401, it instantly alerts the user.

Total Air Quality Detector

Figure 17:
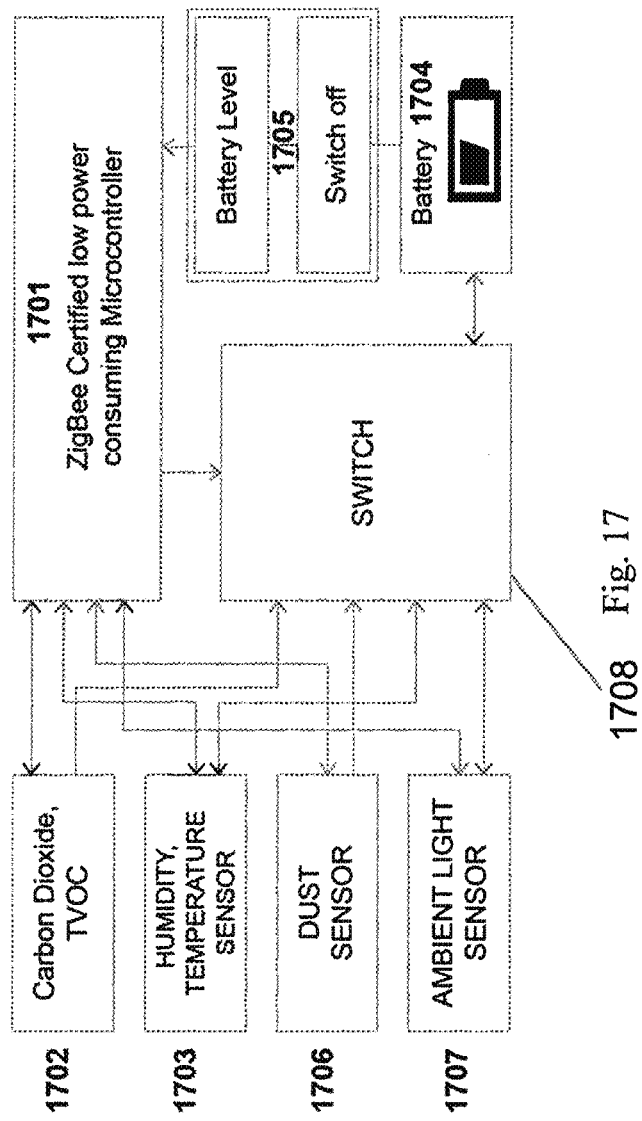
FIG. 17 is a simplified schematic of a total air quality detector including a carbon dioxide and TVOC sensor, humidity and temperature sensor, dust sensor, ambient light sensor, Zigbee certified microcontroller, switches, battery level monitor, and battery.

FIG. 17 shows a schematic of total air quality detector 113. Total air quality detector 113 includes a Zigbee transceiver microcontroller 1701, a combination sensor 1702 for carbon dioxide and TVOC, a temperature and humidity combination sensor 1703, a dust sensor 1706, a light sensor 1707, battery level monitor 1705, a battery 1704, and a switch 1708. Microcontroller 1801 is responsible for processing information and managing operation of the air quality detector 113. Air quality detector 113's main function is to inform the user of air quality in a detailed manner.

Air quality detector 113 is wireless and battery powered. Therefore, minimal power consumption was a factor in selecting hardware components and designing the air quality detector's operation. It is a low power consuming detector that selectively powers its components. Current consumption for oxygen, humidity and temperature, dust, and light sensors are 150 uA, 60 nA, 20 mA, and 2 uA, respectively. Additionally, there is built-in a battery level monitor 1705. Monitor 1705 is powered only during the measurement to conserve battery 1704.

As mentioned above, power consumption is emphasized in the sensor design. Particularly, microcontroller 1701 performs the following functions to conserve battery 1704:
- operates detector in sleep mode with timed settings; and
- dynamically adjusts sleep timer based on user behavior.

Principle of Operation and Modes

Air quality detector 113 operates in sampling mode where measurements take place at some time intervals. However, the user can request for reading of any sensor at any time.

Figure 18:
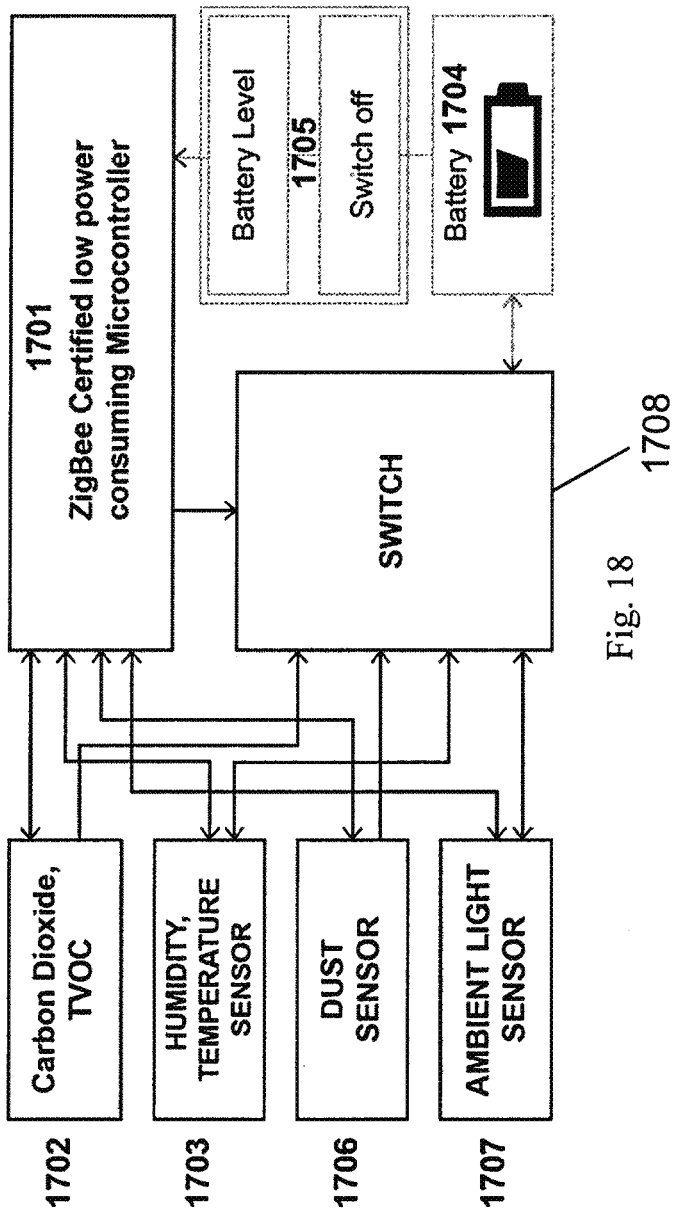
FIG. 18 is an operational schematic of the sensors of the air quality detector of FIG. 17.
Figure 19:
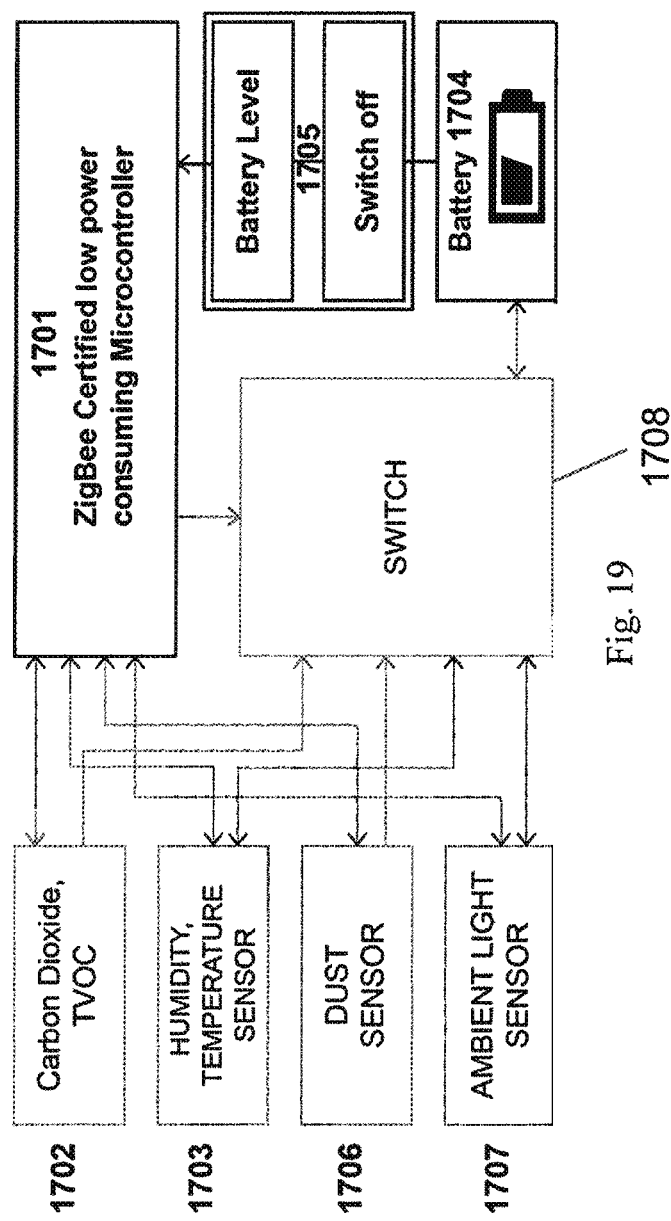
FIG. 19 is a schematic of the total air quality detector of FIG. 17 with the active battery level monitor powered and active.

FIG. 18 shows an operational diagram of the sensors in the sampling mode, while FIG. 19 shows an operational diagram of the active battery level monitor. In FIGS. 18-19, the bold arrowed lines indicate the active elements in each mode.

Software Overview

The home automation system described herein is a highly fluid, self-sufficient, all-inclusive, new type of software solution designed for home automation devices. In an exemplary embodiment, the operating system, Dobu-A, is a customized Android operating system (OS) specifically designed for home automation. Specifically, as will now be described, the Dobu-A operating system has innovations in:
- Design and user interface
- Initiating service management
- Intelligent service management Dobu-A creates an Android version for a home automation system that features a completely new outlook, dynamic graphic user interface, and more importantly, it seamlessly integrates additional software components. The system is also capable of managing real-time data flow and performing heavy computational tasks. In addition, Dobu-A is a compact and agile system because Dobu-A includes functions that are solely dedicated to a home automation system. As a result, its operational capability is greatly increased and interoperability is much easier for settings and user applications of the Dobu system. FIG. 1 illustrates the main architecture of the system.

Dobu-A features a whole new user interface environment specifically designed for home automation. The user interface is dynamic as the user is allowed to rearrange it freely. Information about end nodes of the system, their status, statistics of each node, etc. or control for end nodes etc. can be made easily accessible by the user simply by placing a group 2001 of icons (applications) 2002 (FIG. 20) directly on the user screens. This type of freedom makes interaction with the automation system very much user-specific and individualized. Moreover, the user interface provides the user with several ways of accessing a certain function.

The home automation system includes an initiating service management (IniSM) module 120 that makes tasks associated with home automation system easier and efficient for user and system alike. With this IniSM 120 all-inclusive user access platform that communicates between the user and end nodes, local storages for log, commands, data, and events are inherently integrated into the operating system, instead of utilizing additional applications. Particularly, the IniSM implements following background services. These are:
- notifications and alert messages;
- communication between home automation system and web server;
- communication between home automation system and mobile devices;
- communication between home automation system and Zigbee enabled devices, i.e. end nodes; and
- local storages for log, commands, data, and events etc.

The intelligent service management (IntSM) module 130 of Dobu-A represents a next level of smart home automation system that is able to learn and evolve. The simplest automation includes user defined, time-specific events that are assigned to the automation system. The user is tasked with determining all instructions. In general, an automation should be able to offer automated actions to the user, or recommendations for approval if needed. The IntSM 130 employs a complex mathematical model designed for a self-learning process.

The IntSM constantly analyzes all actions happening at the Dobu home automation system. It performs timeline analysis and user behavior analysis. Based on the analyses, the IntSM 130 recognizes patterns and does pattern based classifications that are aimed at finding automated solutions or improving efficiencies. Finally, the IntSM 130 recommends sets of action plans to the user and with the user's approval or change implements the recommendations. Furthermore, this is not a single cycle process as the IntSM 130 constantly learns and evolves to better reflect the home needs.

User Interface and Design

When using a separate application to remotely access secondary devices, the user experiences a number of shortcomings when interacting with the user interface. It requires the user to learn specific orders of commands and pass through several different user screens. The interface of the Dobu system described herein simplifies these processes as Dobu-A offers a new type of user interface environment that is specifically designed for home automation. Since it is designed to take advantage of a user's prior experiences with smart devices, Dobu-A is easy to learn and access.

To create this type of user interface environment, Dobu-A provides a set of interconnected applications. These applications are implemented in different programming layers of the operating system. Particularly, the user interacting application layers 141 (FIG. 1) provides widgets and message alerts and includes a notification center, action bar, settings, menu, lock screen, and user screens, etc. that are modified in the user interacting layer 141.

Figure 20:
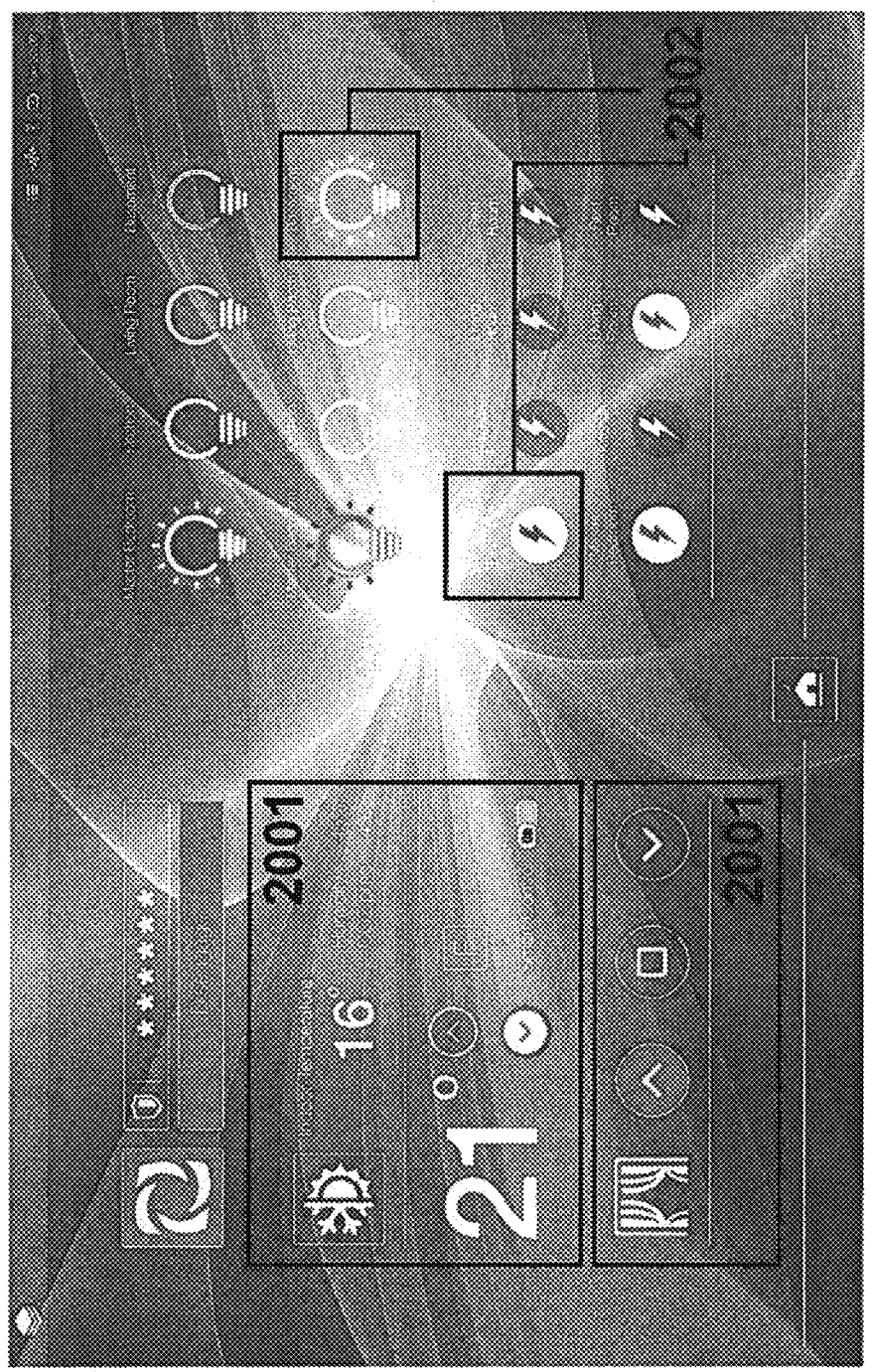
FIG. 20 illustrates an exemplary user interface for selecting the applications of the home automation system of the invention.
Figure 21:
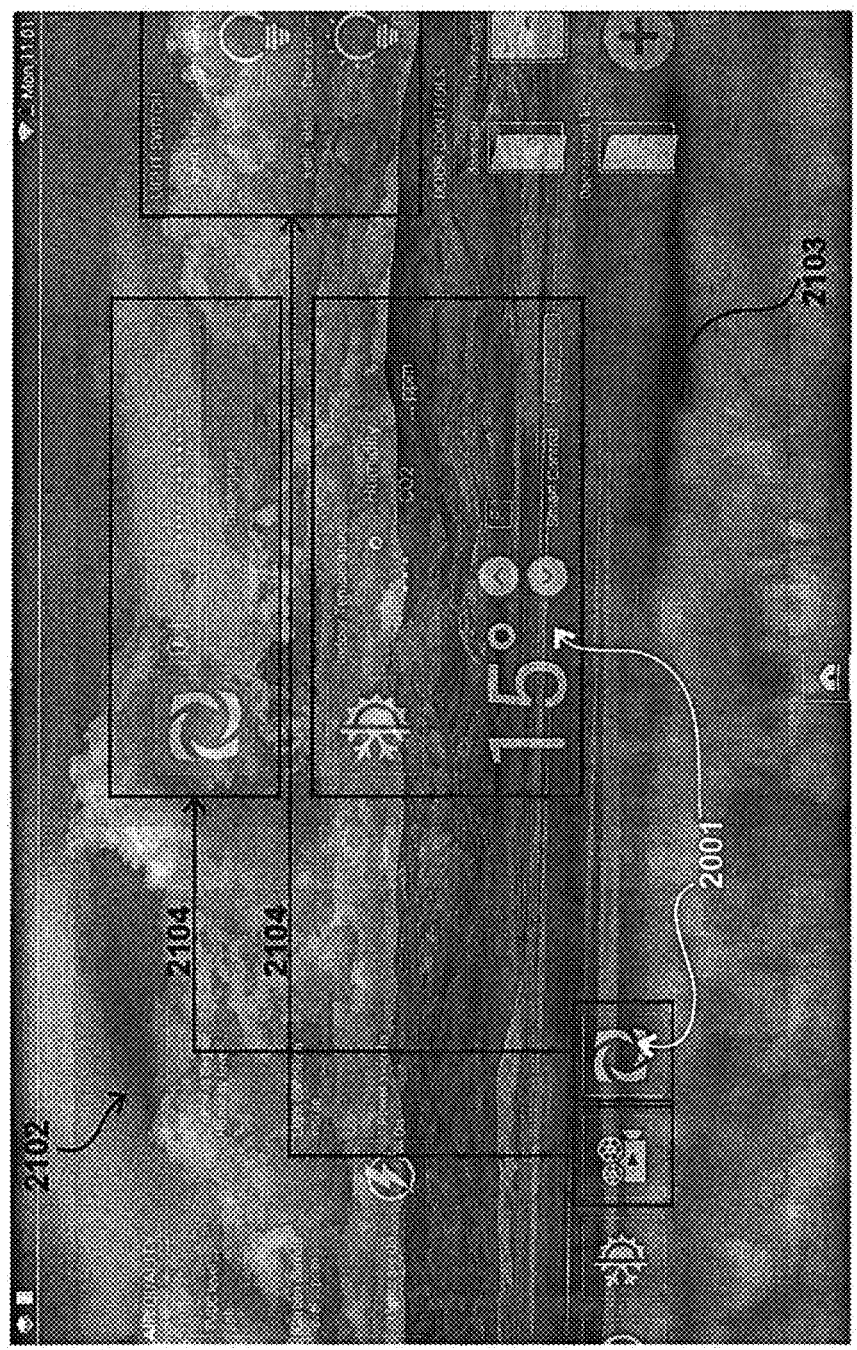
FIG. 21 illustrates how applications may be scaled by functions and moved across user interface of FIG. 20.

In order to create a user-specific and individualized control environment as mentioned above, today's best practice is to develop an application that offers the user a direct access to control. FIG. 20 shows an interface that provides such direct access to the applications. As illustrated in FIG. 20, application 2001 is basically a well-structured group of icons 2002 representing end nodes 101 that are categorized by their functions. Also, it is an active platform for information, such as news and weather etc. In an exemplary embodiment, these applications 2001 are moveable over user screens 2102 and 2103, and scalable in functions 2104, as shown in FIG. 21. Having a user-arranged, self-customized interface eliminates confusion and makes it easy to use for a user.

Figure 22:
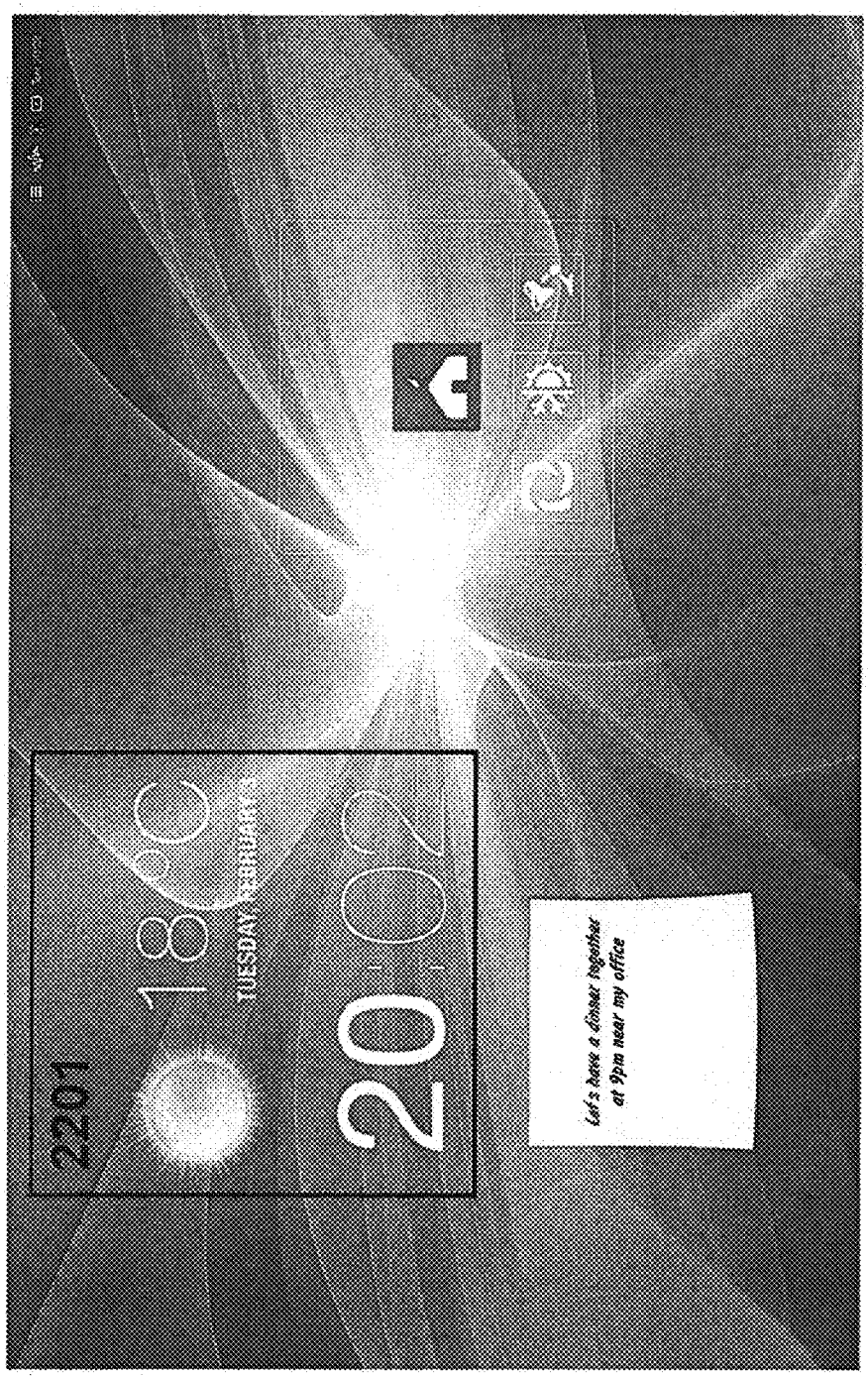
FIG. 22 illustrates a locked screen of the user interface to the central control unit.

Multiple user interface programming is used in Dobu-A. For the lock screen and user screens, an easy-to-use design, a security and a bigger usable screen size for applications were amongst the main concerns in design. FIG. 22 shows a lock screen. Weather application 2201 is placed in the lock screen, by default. However, as mentioned earlier, these arrangements can be modified by the user.

Figure 23:
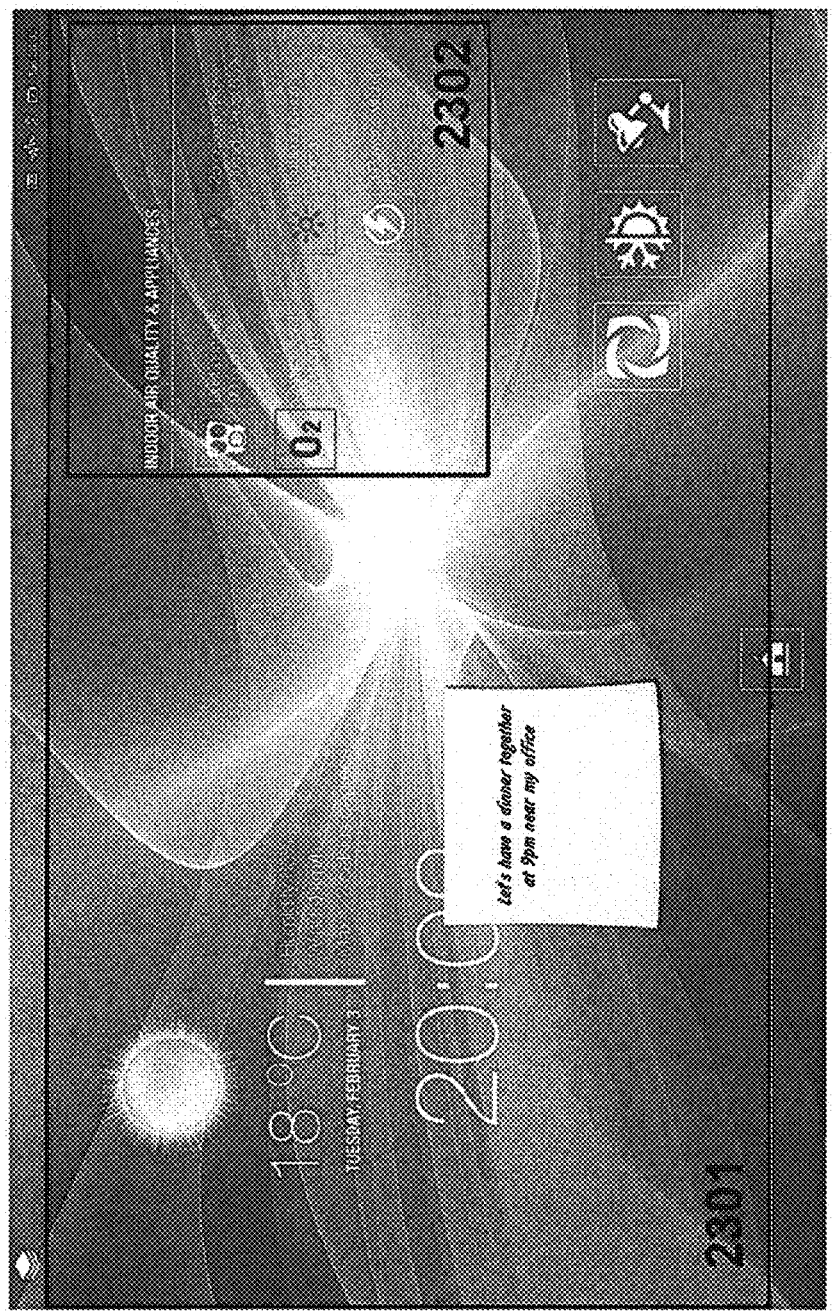
FIG. 23 illustrates an image of a user interface screen in an air quality monitoring mode.

The user screen 2301 is shown in FIG. 23. The notification center 2302 is to keep the user updated about desired statistics and/or alert messages which can be prioritized and simplified. The default notification center 2302 includes information about key statistics, indoor ambient conditions, and alarm messages.

Figure 24:
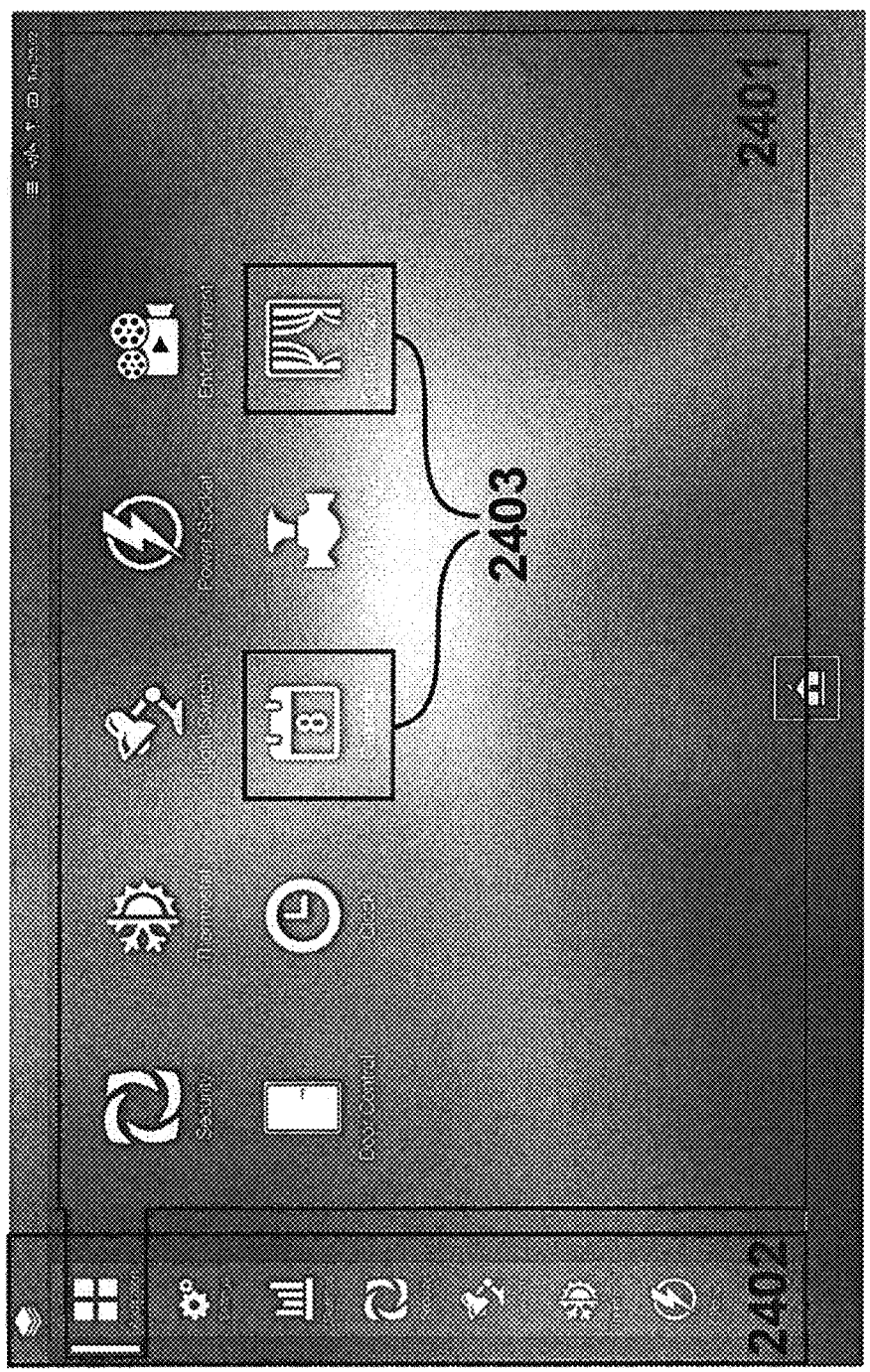
FIG. 24 illustrates an image of the applications tab of the user interface screen.

FIG. 24 shows applications' board 2401 which is directly accessible via Menu 2402. On the other hand, a non-customized operating system usually requires a complex structure of settings, applications etc. From applications' board 2401, the user can drag the applications 2001 and drop them anywhere in the user screens 2301. This can be done multiple times for the same application. More importantly, these features give the user an opportunity to organize and personalize the interface for the user's preference. Such applications may include calendar control and curtain control, as indicated.

Figure 25:
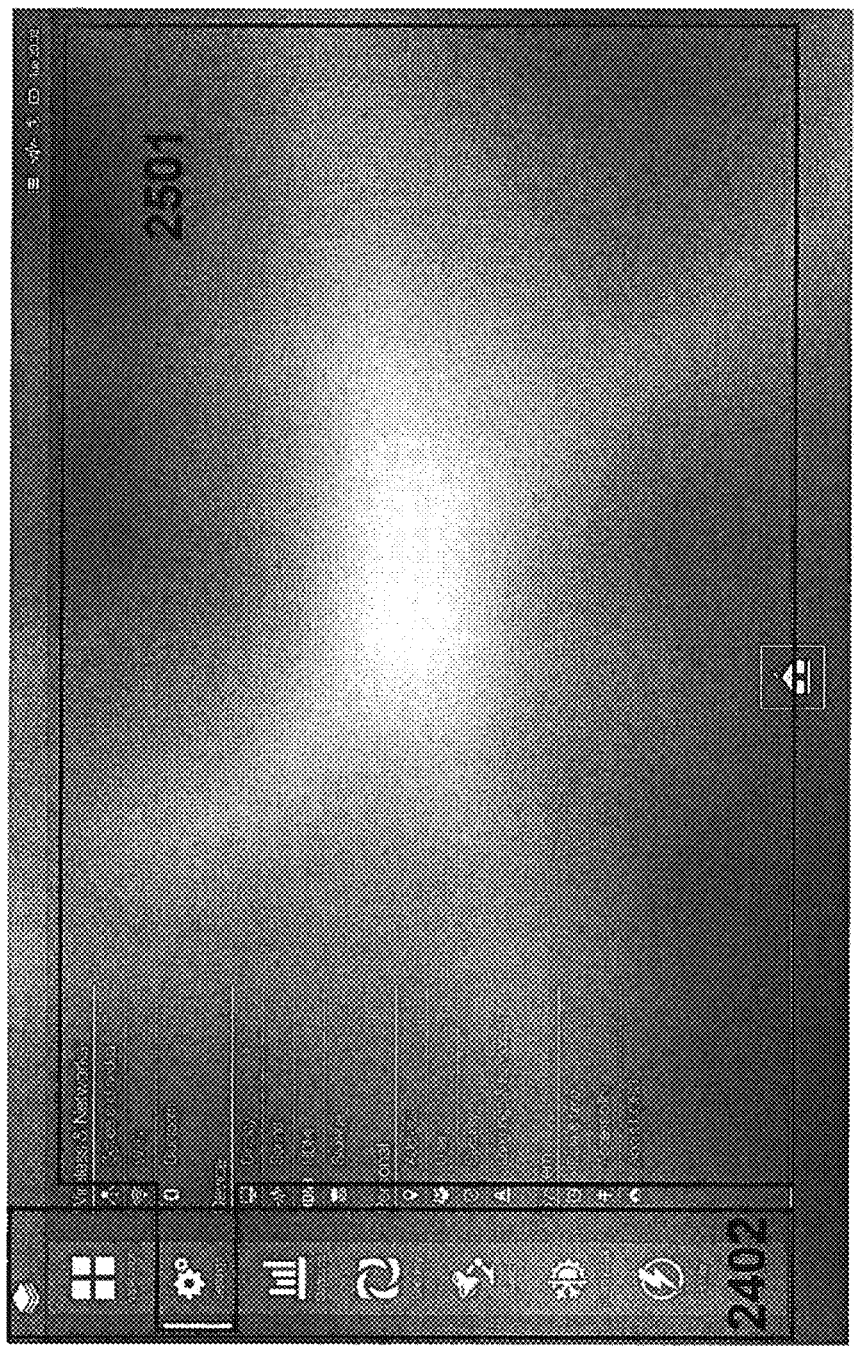
FIG. 25 illustrates an image of the settings tab of the user interface screen.

FIG. 25 shows settings board 2501. The settings board 2501 offers a compact set of configuration functions for properties of end nodes 101, operational modes, and network connections, or other settings. Such properties may include network features, device features, system features, user information, and the like.

Figure 26:
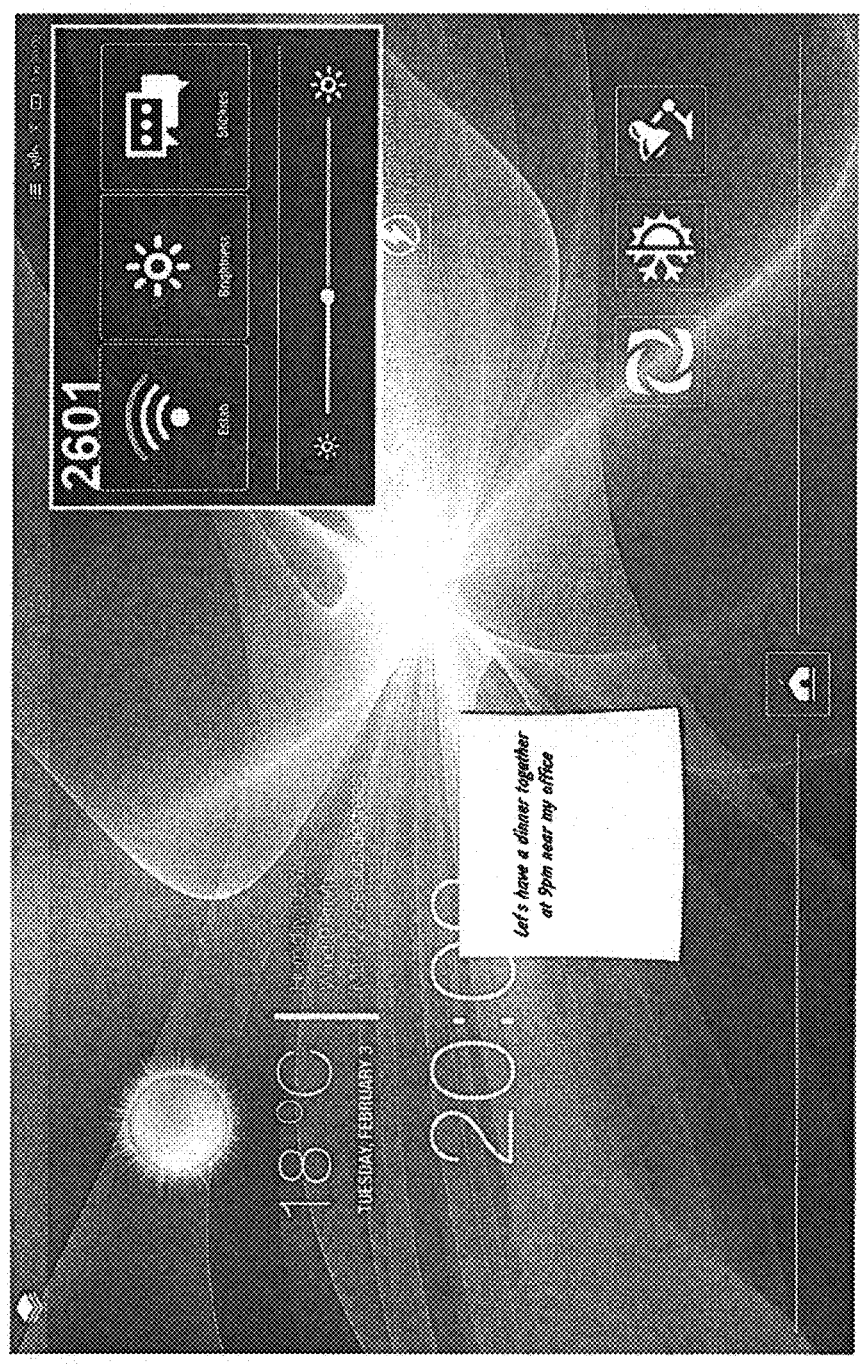
FIG. 26 illustrates an image of the notifications center of the user interface screen.

As shown in FIG. 26, in addition to XU (User Experience) programming, the action bar 2601 may be modified significantly and the notification bar added in the user interface layer of the operating system. Having the action bar 2601 is convenient when multiple user screens are active. By one touch sweep, the action bar appears on. Hence, it provides an ease of access, eliminates confusion, and provides shortcuts to the most commonly used settings.

Initiating Service Management

Figure 27:
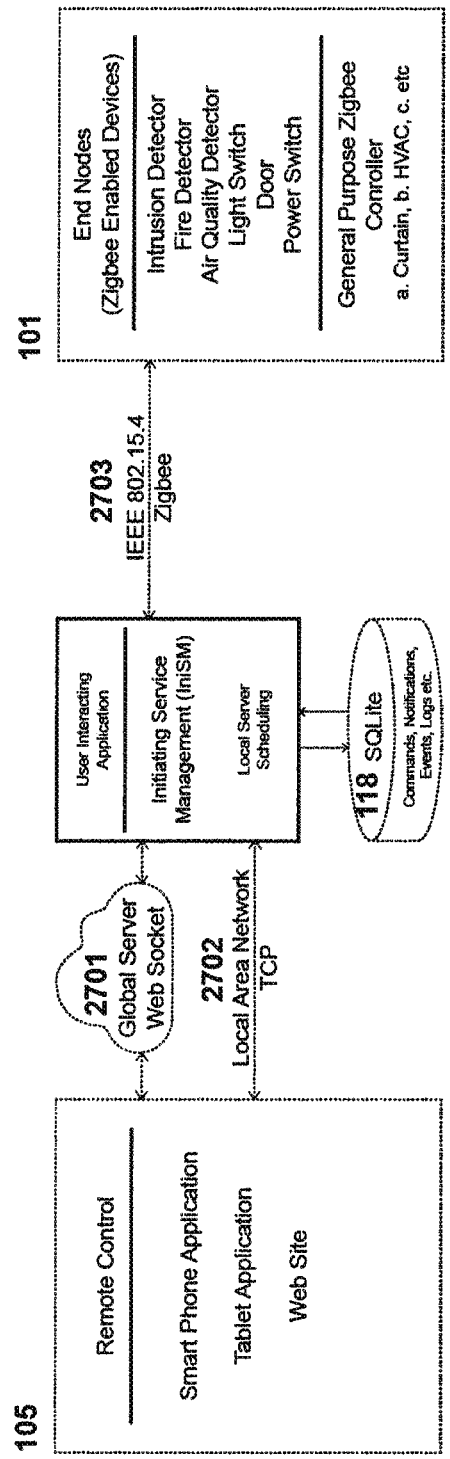
FIG. 27 illustrates a simplified operational diagram for initiating service management using the configuration of FIG. 1.

FIG. 27 illustrates an overview of working flow of the IniSM 120. As mentioned above, the IniSM 120 manages the data flow in addition to being responsible for recording data, logs etc. into the local storages 118. IniSM 120 pushes the notifications and alert messages on the screen as well as to the user. More importantly, the IniSM 120 supports parallel computing methods due to the demand to simultaneously perform these numerous duties. It is in the application framework layer of the operating system. As a result, the IniSM 120 and Dobu-A are more efficient and fast in data handling and efficient in communication which are important for an automation system working in real-time.

The main aim of the IniSM 120 is to provide a secure, reliable, and real-time data flow management between the user and the Dobu system. To successfully perform this service, the IniSM 120 features several different types of internationally agreed communication methods. These are: a) Web socket 2701 for real-time connection with the global server 102; b) TCP (Transmission Control Protocol) 2702 for organizing local area communication between the user and the Dobu system; c) Zigbee 2703 protocol for conveying commands and information to and from Zigbee enabled devices, i.e. the end nodes 101. Depending on the network that the user is utilizing, the IniSM 120 automatically chooses a communication method of either Web socket 2701 or TCP 2702 for communicating with the user. Furthermore, the IniSM 120 is capable of managing more than one connection simultaneously.

Figure 28:
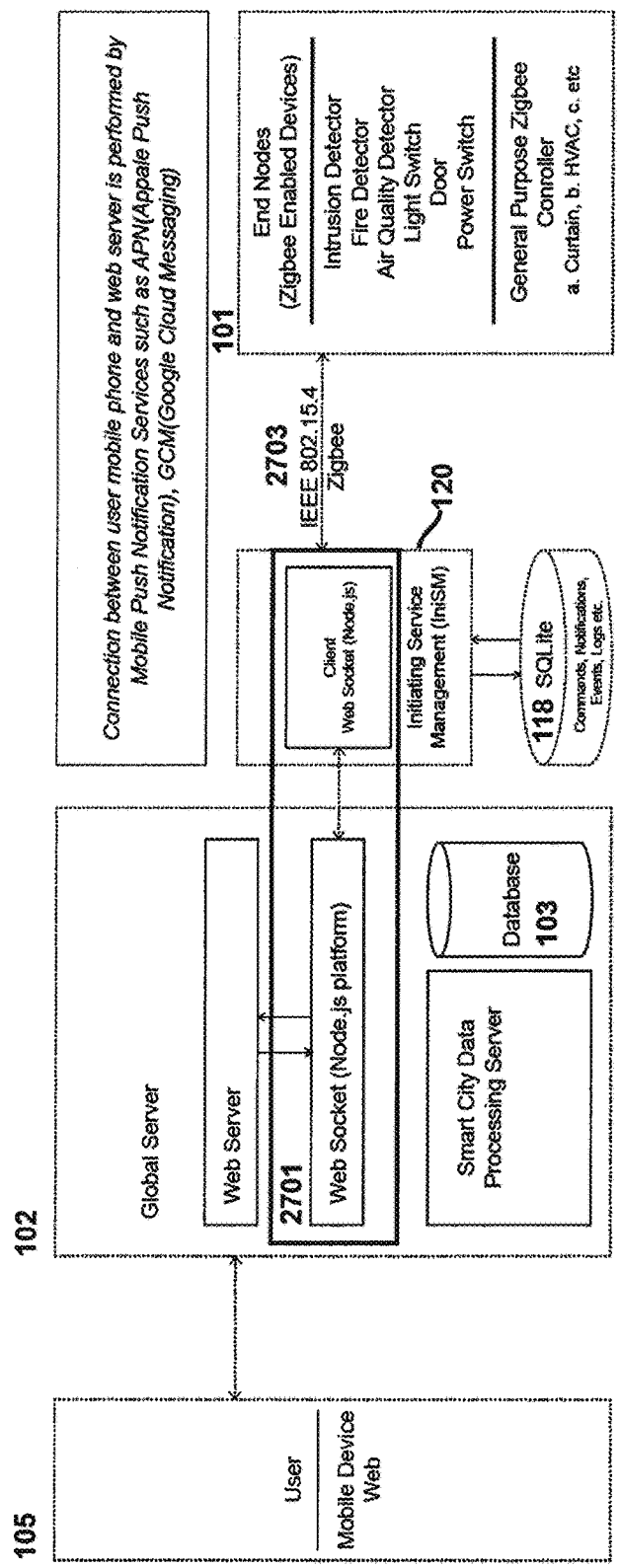
FIG. 28 illustrates a data flow diagram of a web socket connection using the configuration of FIG. 1.

FIG. 28 shows a data flow diagram for Web socket 2701. Web socket protocol 2701 enables the IniSM 120 to establish a highly encrypted communication with global server 102 when the user remotely accesses the home automation system via the internet. When the commands and/or requests from the user are received via web socket protocol 2701, the IniSM 120 encodes and/or decodes these into the Zigbee protocol 2703, and relays to and from the Zigbee enabled devices, i.e. the end nodes 101. Also, using this connection IniSM 120 is able to transmit the alerts and notifications, including statuses of Zigbee nodes etc. 101, to the user via global server 102. In an exemplary embodiment, the connection between a user mobile device 105 and global server 102 is performed by Mobile Push Notification Services such as APN (Apple Push Notification), and GCM (Google Cloud Messaging).

Figure 29:
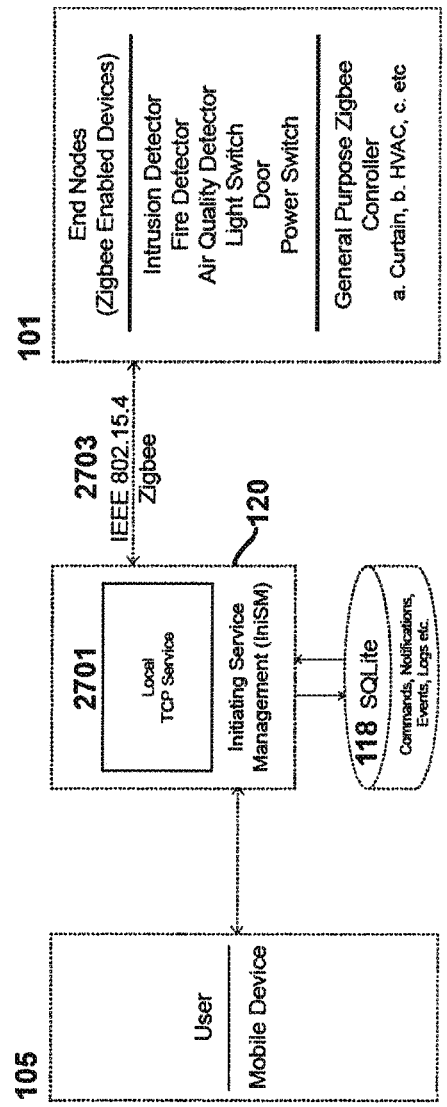
FIG. 29 illustrates a data flow diagram of a TCP connection using the configuration of FIG. 1.

FIG. 29 shows a data flow diagram for TCP 2702. By implementing local TCP service 2702, IniSM 120 is able to provide a direct connection between the user and the Dobu system over local area network, which may be a Wi-Fi connection or a Bluetooth connection. Particularly, IniSM 120 establishes a communication between the Dobu system and the user's mobile devices 105 through a selected secure socket over local area network. While the communication protocol is different, the security and operation principles of IniSM 120 remain the same as described above with respect to FIG. 28. As will be appreciated by those skilled in the art, since TCP 2702 communication is not routed through the global server 102, the user saves the cost for internet connection and experiences a reliable control and a faster response.

Figure 30:
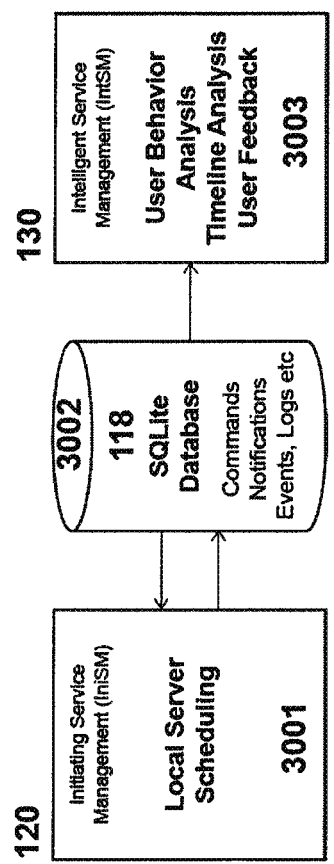
FIG. 30 illustrates a simplified structure of the Initiating Service Management, Intelligent Service Management, and the local database.

FIG. 30 shows a data flow diagram between the IniSM 120, IntSM 130, and local SQLite database 118. IniSM 120 locally stores raw data in a predetermined local SQLite database 118 for IntSM 130 to analyze and ultimately learn the user's daily routines. IniSM 120 captures and sorts all commands, requests, and data of utilities usage etc. every time that a communication occurs between the user and the Dobu. In another words, local SQLite database 118 is in between IniSM 120 and IntSM 130. In addition to storing data for IntSM 130, IniSM 120 records an error log, an event log, action log, and a communication log etc. into local database 118 for bug fixing and a future development of Dobu-A.

Intelligent Service Management

Figure 31:
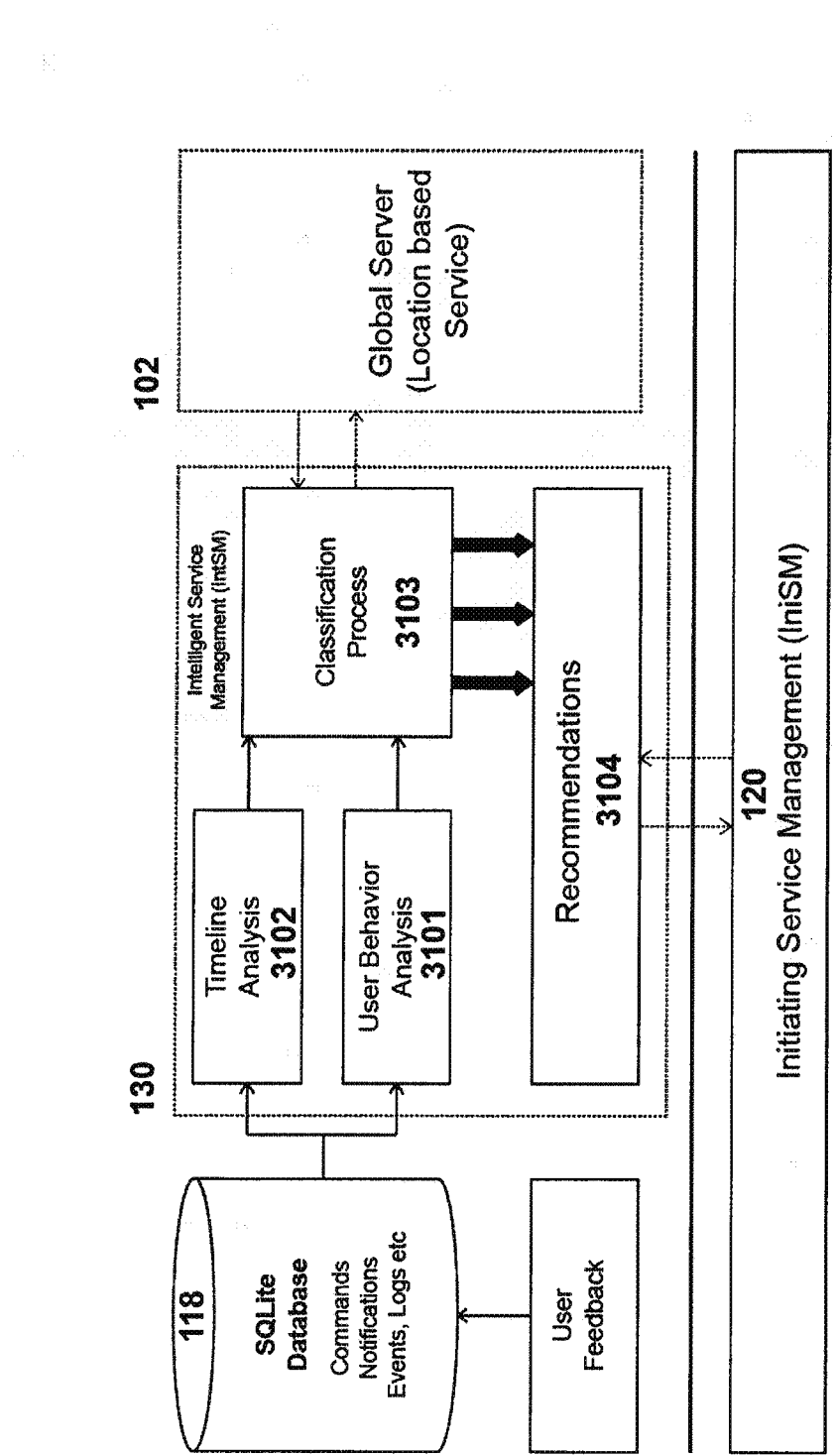
FIG. 31 illustrates the structure of the Intelligent Service Management.

FIG. 31 shows the structure of IntSM and how it is integrated with Dobu-A. The IntSM 130 implements the following features for home automation:

Data analysis 3101 and 3102
Pattern-based classification 3103
Recommendation service 3104.

Figure 32:
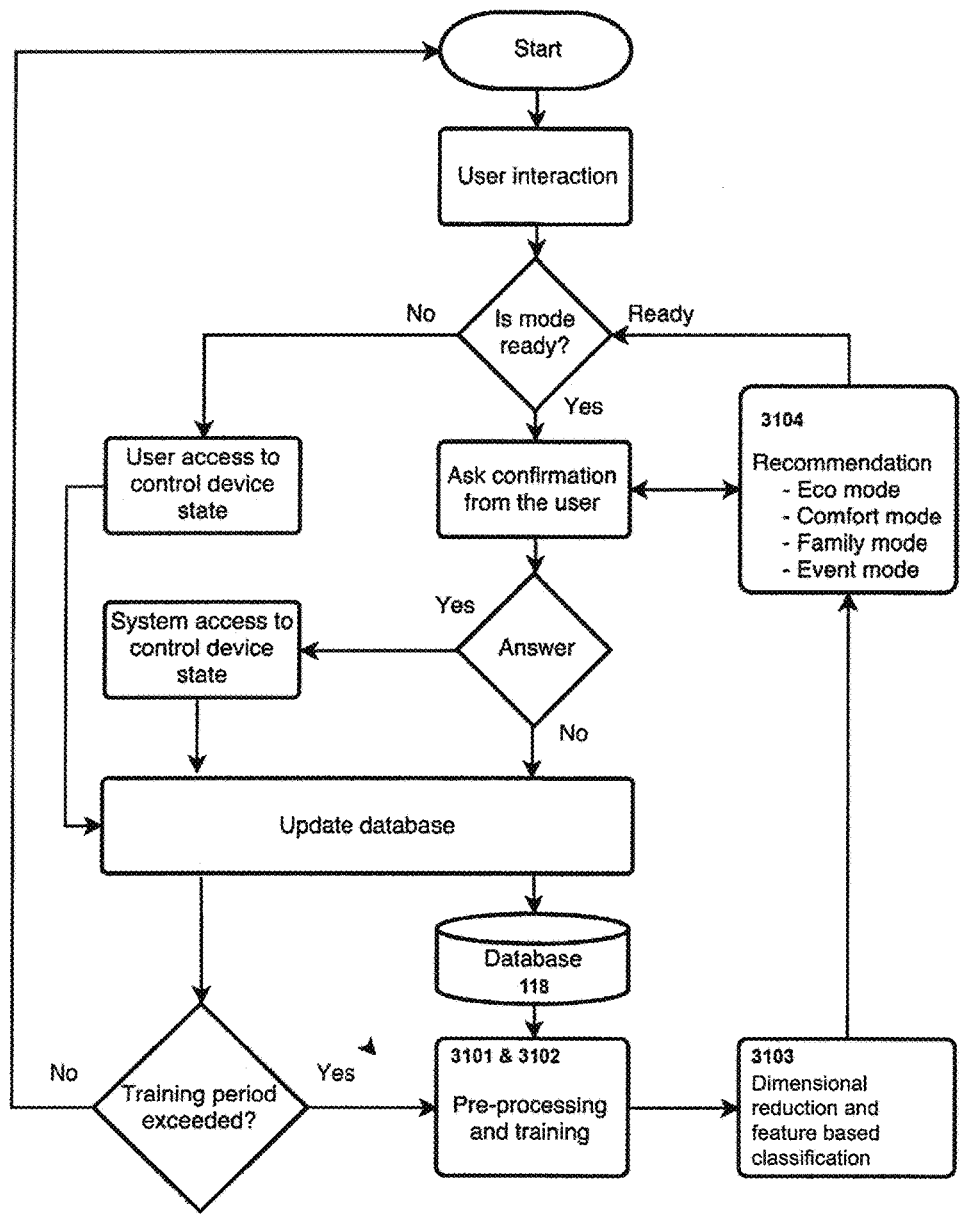
FIG. 32 illustrates a simplified algorithm for the smart learning process.
Figure 33:
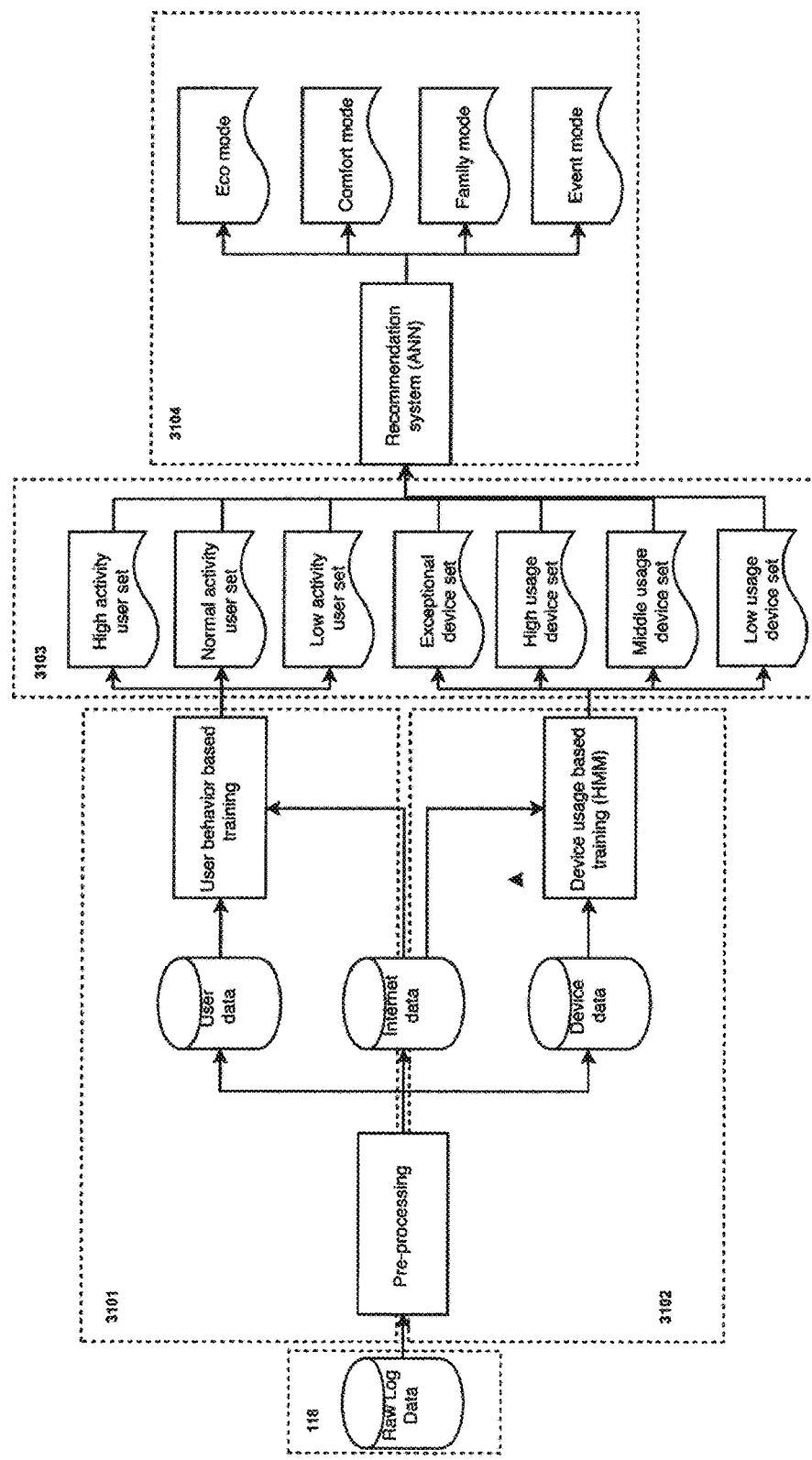
FIG. 33 illustrates a flow chart for analyses, classification, and recommendation services of the Intelligent Service Management.

IntSM 130 provides user-centered smart learning. In another words, IntSM 130 learns and ultimately frees the user of operational tasks while keeping the user as a decision maker. A simplified algorithm for the smart learning process is shown in FIG. 32. Whenever there is a change in either device status or an event is registered, based on the system status, the database 118 is updated and IntSM 130 analyzes the data stored in the database 118. Specifically, IntSM 130 does timeline analysis 3101 and user behavior analysis 3102. Afterwards, IntSM 130 does pattern based classification 3103 and proposes different working schedules 3104 to the user as recommendations. A simplified flow chart of the analyses 3101 and 3102, classification 3103, and the subsequent recommendation services 3104 are shown in FIG. 33. With the user's approval, these recommendations are implemented via IniSM 120.

User Behavior Analysis 3101

Figures 37, 38:
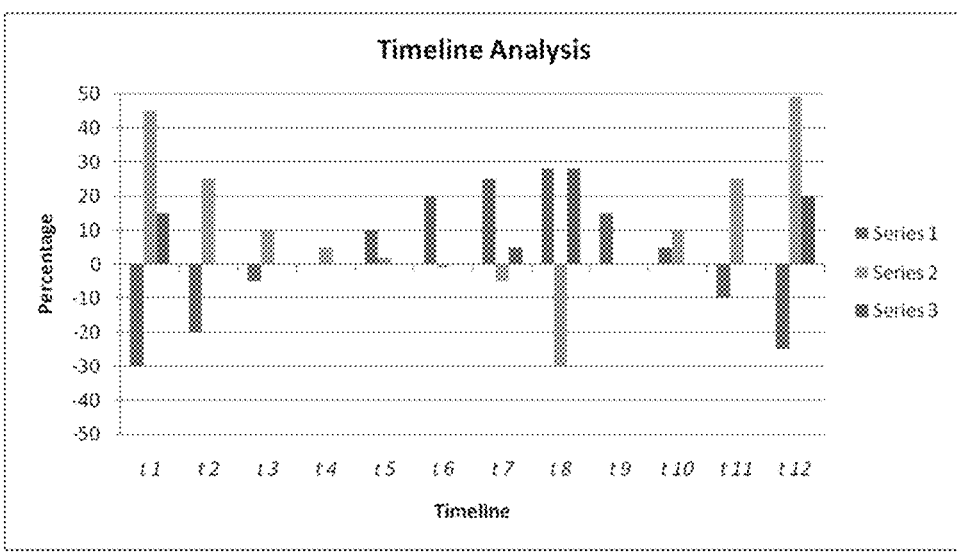
FIG. 37 illustrates exemplary user behavior analysis.
FIG. 38 illustrates exemplary timeline analysis.

IntSM 130 does user behavior training by observing the user's sequential pattern. Exemplary user behavior analysis is shown in FIG. 37. Devices or end nodes can correspond to a number of household appliances such as lights, door, windows, curtains, TV, stove, oven, and faucets etc. Each end node potentially can occupy several states, e.g. on/off, up/down, enabled/disabled, active/semi-active/not-active etc. Every action that is taken by the user results in a change in the end node state. Information corresponding to the change, including an original state, a final state, time, date, user, action location (office/bedroom/kitchen/car), tools (mobile/web), sensors (intrusion/fire/temperature) will be recorded into the database. The IntSM 130 dynamically analyzes sequences of data by implementing Bayesian inference, $P(Device_i|Device_j)$.

Upon analyzing this information, IntSM 130 proposes a hypothesis on the user behavior and predicts the user's actions prior to the action itself.

IntSM 130 monitors and analyzes home utility usages, including but not limited to, electricity, water, gas and heating etc. via its timeline analysis feature. Exemplary timeline analysis is shown in FIG. 38. On the other hand, smart learning gathers local/global information from the global server 102 to account for outside factors that are not directly related to the house yet may be affecting the actions occurring in the house. Then, the information is stacked and mapped against time variables. For instance, in FIG. 38, series 1, 2, and 3 may correspond to electricity usage or water usage, weather information (global) and intrusion (global or local) information, respectively. Based on this sequential data, IntSM 130 performs device usage based training by utilizing hidden Markov model (HMM).

Pattern Based User Activity and Usage Classification 3103

In order to maximize the effectiveness, IntSM 130 uses a model to classify user activities and utility usage. Smart learning uses a N-dimensional vector space approach in classifying overall home automation. A number of patterns such as user behavior, different utility usages and actions per user, local/global and other factors are taken as vector components. The learned user behavior and timeline correlation, as described above, are used as inputs to the model. Users are divided into different groups based on their action, activity and level thereof. For example, a user who is at home, e.g. stay-at-home parents, is a high activity user. On the opposite, a user who comes in occasionally, e.g. regular visitors such as grandparents, is a low activity user. In between are semi-active users who resides at home, but usually away, e.g. a fulltime working homeowner. On the other hand, individual user's specific actions are also classified, in other words which action a certain user is most likely to take. For example, user can be categorized into most-likely, occasional, or most-unlikely to cook etc.

Furthermore, homes are classified based on its utility consumption. Simplest classification can be high, medium, low. Factors to consider for the classification are not limited to overall or any specific utility, but also include, but not limited to, number of wall outlets, faucets, residents in a home, weather, and other internal or external factors. Some of these factors are gathered from local or global servers while others are requested by the IntSM 130, of homeowner, to increase its learning efficiency.

IntSM 130 is able to project this multi-dimensional vector space into interested axes, whether it be users, times, or end nodes, etc., to filter out specific information for the purpose of recommending different solutions to the user. In other words, IntSM 130 performs dimensional reduction on the data. Moreover, IntSM predicts safety time zone and high risk interval for intrusion.

Recommendation Service 3104

The IntSM 130 is able to offer a number of solutions based on the main objective. The objectives may include, but not limited to, minimizing utility usage, providing comfort for a specific user or larger group of users, or setting the home for a special event. IntSM 130 uses an artificial neural network to recommend the following modes that correspond to these objectives:

Eco mode
Comfort mode
Family mode
Event mode as shown in FIG. 33. Each mode is a different projection of the pattern-based classification space.

Eco Mode

In Eco mode, the main goal is to minimize the utility consumption, whether electricity or water or gas. Briefly, based on its analysis, IntSM 130 offers, including but not limited to, automatic turn off functions, increased activity in alarm and notification functions, automated HVAC control, information on consumption, and budget planning services. For example:

Turning off devices: Based on the user classification and related usages, the IntSM 130 disengages appliances/end nodes in a room if no motion is detected in the room for a set period. In another words, the IntSM 130 makes a decision based on several factors, not just one, e.g. motion.

Automated HVAC: The Dobu-A is able to control the house HVAC in an automated manner. In order to reach such a level of automation, IntSM 130 uses a multi-faceted model that considers users' behavior, pattern-based recognition, and other factors, including that acquired from global server 102. Particularly, the smart learning determines its own objective based on the classification and takes necessary measures to achieve the goal.

Automatic alarm and notifications: One of the easiest ways to save energy is to simply reduce unnecessary usages. This is a task that IntSM 130 handles with the help of the homeowner. Specifically, IniSM 130 keeps track of every end node in the house as described above about user behavior analysis. Moreover, IntSM 130 can track movements within the house and determine if someone is present in a room where a certain appliance/end node stays active for an unusually long period of time. IntSM 130 makes a decision based on these factors, and sends an alarm to predetermined parties.

Information and budget planning: IntSM 130 lets the user know about the current and the expected utility consumption. Additionally, IntSM 130 breaks down the consumption by user defined categories, so the user could plan in an economical way.

Comfort Mode

In Comfort mode, the objective is to create a comfortable environment for a user. In this mode, IntSM 130 offers automatic turn on/off functions, alarm and notification functions, automated HVAC control in addition to providing the information on consumption and budget planning services etc. In this mode, decisions of IntSM 130 are mainly based on the user's behavior analysis.

Family Comfort Mode

In Family Comfort mode, the objective is to create a comfortable environment for multiple users. Similar to the Comfort mode, IntSM 130 offers automatic turn on/off functions, alarm and notification functions, automated HVAC control in addition to providing the information on consumption and budget planning services, etc. However, decisions of IntSM 130 are generally based on timeline analysis rather than user behavior analysis.

Event Mode

Figure 34:
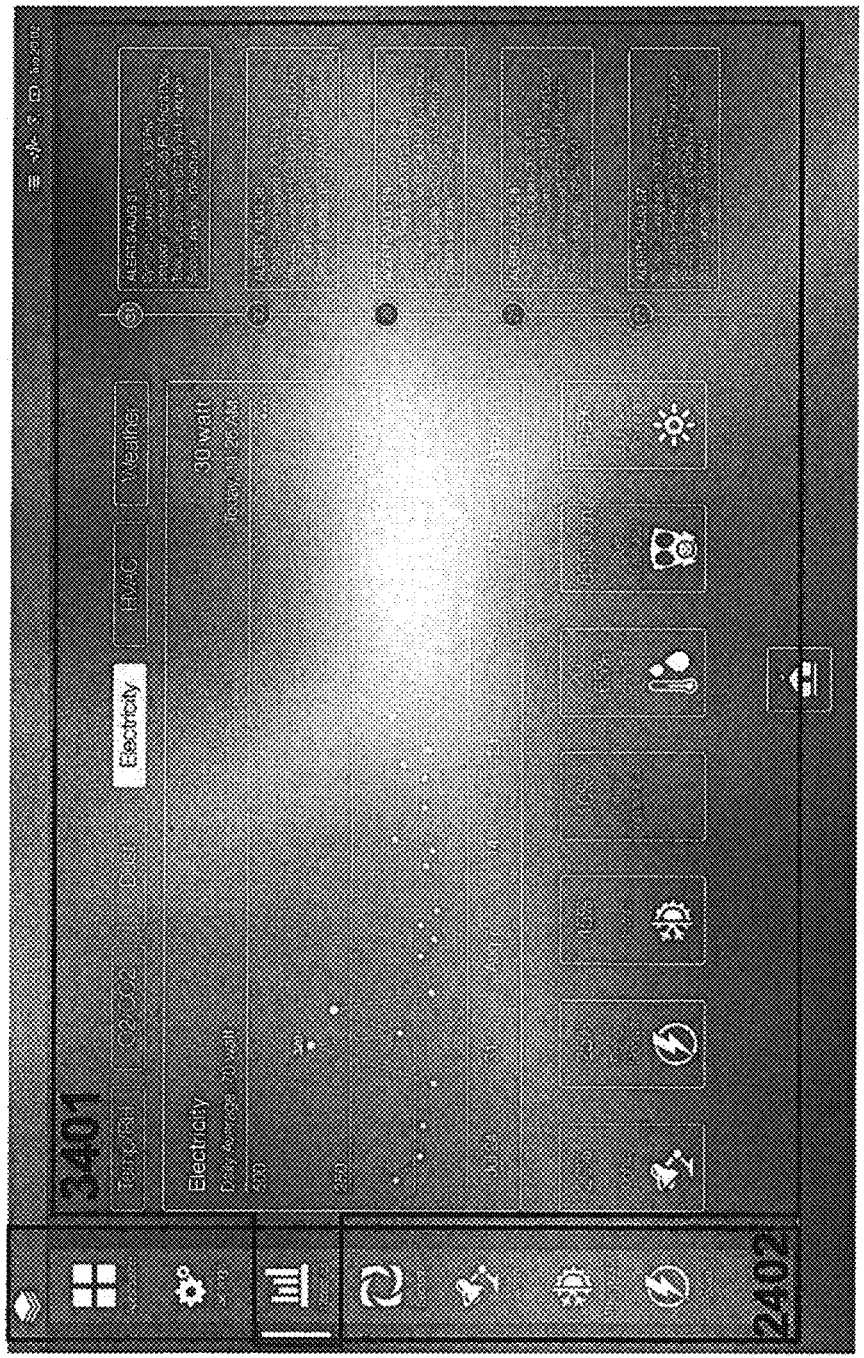
FIG. 34 illustrates an image of the statistics window of the user interface screen.

In Event mode, the objective is to create an environment for a special occasion. Dobu can be set to this mode either by user or IntSM 130 based on the information provided by the user. Once the Dobu is set to this mode, IntSM 130 either requests information of the user or makes decisions according to either predetermined protocol or prior similar events. IntSM 130 offers automatic turn on/off functions, automated HVAC control in addition to providing the information on consumption and budgeting service for future event planning etc. In all modes, other home automation functions, such as anti-intrusion or surveillance functions etc., will be active regardless of the operational mode. Moreover, the statistics on utility consumption and other global information are easily accessible from main menu. FIG. 34 shows statistics board 3401 which is directly accessible via menu 2402.

Cluster Based Smart City Solution

In an embodiment of the invention, the Dobu system described herein is implemented as part of a smart city concept in which complex city planning reflects the need for minimal utility consumption, safe and secure neighborhoods, and health and safety of its citizens. Such a smart city solution makes use of Dobu home automation systems and simplifies the need for infrastructure associated with building a smart city. Particularly, the cluster based smart city takes advantage of the data processing capability of the Dobu home automation system. More particularly, the cluster based smart city utilizes Dobu's smart learning capability to analyze and determine city wide behavior patterns or trends by clustering. The resulting smart city solution presents a new kind of automated city planning and operation.

Figure 35:
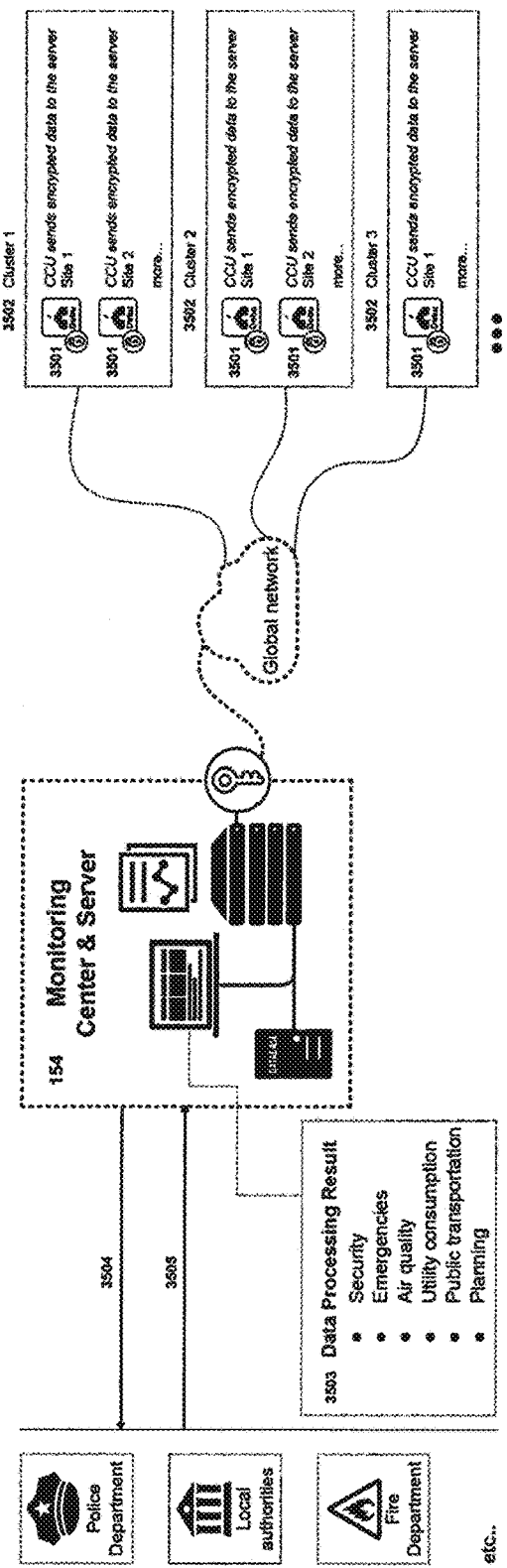
FIG. 35 illustrates a simplified overview of a cluster-based smart city concept based on the home automation system of the invention.

FIG. 35 shows a simplified overview of the cluster based smart city concept of the invention where a smart city is created that has its foundation in individual Dobu home automation systems 100. Particularly, a smart city is created by a) outsourcing data processing to local Dobu units 3501; b) clustering (3502) the Dobu units 3501 of the city by different criteria; c) performing dynamic analysis (3503) of cluster based data; d) proposing a hypothesis about the clusters 3504; and e) performing and approaching the true value by iterations and feedback with city administrators 3705.

More particularly, the smart city embodiment offers an alternative way to provide big data processing, city wide data about utility consumption, crime rates, health and safety indicators etc., by locally processing raw data with the help of Dobu home automation systems. This task is done on Dobu systems 3501 as described above. In another words, pattern-based user behavior, usage behavior, timeline analyses, and events (intrusion, fire, smoke, air quality change etc.) are collected and processed by individual Dobu systems as described above.

Figure 36A:
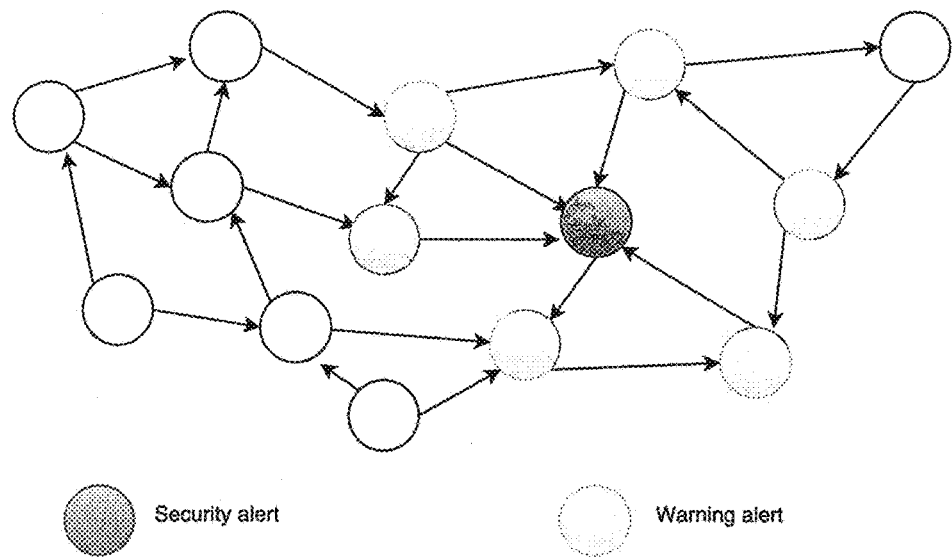
FIGS. 36A and 36B illustrate an exemplary clustering for safety (FIG. 36A) and for energy consumption monitoring (FIG. 36B) for the smart city concept of FIG. 35.
Figure 36B:
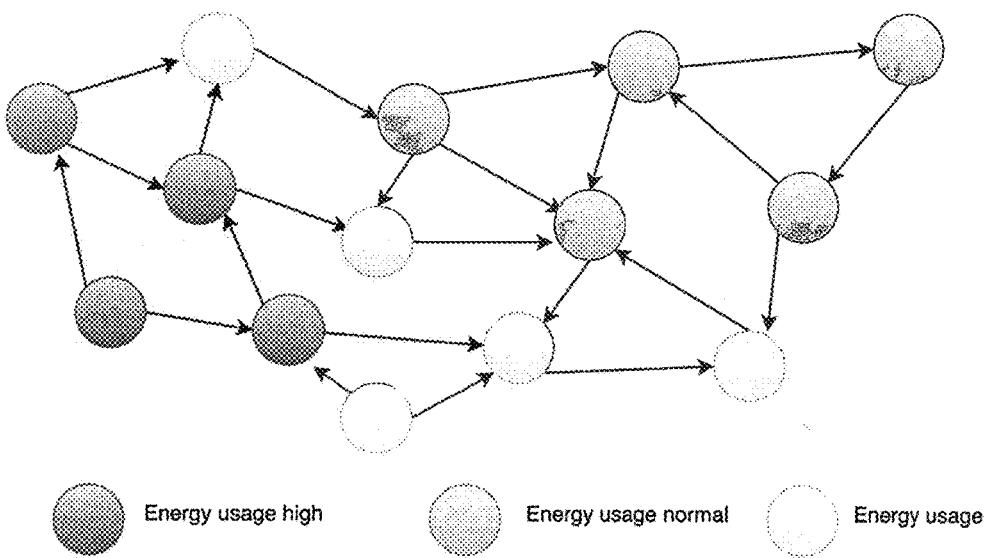

Subsequently, the city is mapped by each pattern or behavior and divided into clusters 3502 based on different criteria of interest or similarities, such as location, household behavior or utility consumption, etc. FIG. 36 shows exemplary clusters by safety (FIG. 36A) and by energy consumption (FIG. 36B). Collective behavior of individual members within the cluster are matched. Dobu systems that are in use serve as sample points. The clustering is particular and dynamic based on the criteria. This process is carried out at city level, not on individual automation systems. Doing so is easier since now all information can be compartmentalized or selected for its importance for a specific clustering. On the other hand, data processing 3503 is much more streamlined since raw data will have been already analyzed and only the home automation system with data of importance are selected for clustering.

Smart learning at city level (smart city learning) includes analysis of interest and related hypothesizing. These can be done at smart city server 154 by utilizing different statistical techniques and mathematical modeling, including, but not limited to, Bayesian inference, sampling, correlating, or approaching. At the end, smart city learning proposes a hypothesis for expected pattern or behavior, predicts an action, analyzes dynamic variance as it happens and corrects the hypothesis and so on. City planners or administrators can use these recommendations and provide feedback to the system to improve the accuracy of the automation. Moreover, as it is with Dobu IntSM 130, smart city learning is a continuous and iterative process. This kind of smart city solution simplifies, if not eliminates, the need for additional physical infrastructure covering all of a city. Instead, it uses individual smart learning automation systems that are already in use across the city. Additionally, in the cluster based smart city solution, privacy of the user is protected as user specific behavior or action is masked by dynamic analysis occurring at the local level.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. For example, the microcontrollers used herein may be replaced by microprocessors and vice-versa where appropriate. It is understood, therefore, that the scope of the present disclosure is not limited to the particular examples and implementations disclosed herein, but is intended to cover modifications within the spirit and scope thereof as defined by the appended claims and any and all equivalents thereof.

We claim:

1. A home automation system, comprising:
a plurality of detectors that detect at least one of fire, home intrusion, flood, air quality, lighting status, door lock status, heating and air conditioning status, and entertainments system status;
a user interface; and
a control unit programmed to:
communicate with said plurality of detectors to select modes of operation of said detectors, to receive notifications and alert messages from said plurality of detectors, to provide said notifications and alert messages to a user via said user interface,
store commands, data, and events detected by said plurality of detectors,
perform timeline analysis and user behavior analysis on the stored commands, data and detected events to recognize usage patterns for home systems and to recommend an action plan for changing settings of said home systems, and
provide control commands to the home systems based on the recommended action plan and/or based on instructions provided by the user in response to the recommended action plan, wherein the plurality of detectors include a fire detector comprising a microcontroller, a smoke sensor, and a temperature sensor, wherein the microcontroller selectively powers the smoke sensor and temperature sensor in different modes of operation to conserve power.

2. The system of claim 1, further comprising a server that connects said control unit to a user access platform via an Internet connection and communicates with a remote emergency and/or security service.

3. The system of claim 2, wherein the user access platform is provided on a remote unit including a computer, a smart phone, and/or a tablet.

4. The system of claim 1, wherein the control unit includes a combination antenna for at least three different wireless communication protocols including Wi-Fi, Bluetooth, and Zigbee communications.

5. The system of claim 4, wherein the control unit further includes another antenna for cellular network based communication.

6. The system of claim 1, wherein the control unit further includes a resetting circuit having inputs connected to home and power buttons and an output connected to a reset of a power chip of the control unit, the resetting circuit including circuitry whereby a reset signal is provided to the output only when both the home and power buttons are depressed simultaneously.

7. The system of claim 1, wherein the modes of operation of said detectors selected by the control unit include low power modes for limiting power consumption of the detectors during normal operation.

8. The system of claim 1, wherein the smoke sensor includes an Infrared-Light emitting diode and a photovoltaic transistor and provides an output voltage to the microcontroller indicating whether or not smoke is present.

9. The system of claim 1, wherein the different modes of operation include a mode in which only the smoke sensor or the temperature sensor is active until smoke or a temperature increase is detected, wherein once smoke is detected, the microcontroller activates the temperature sensor, informs the control unit, and monitors continuously with both sensors or once a temperature increase is detected, the microcontroller activates the smoke sensor, informs the control unit, and monitors continuously with both sensors, and wherein the microcontroller alerts the control unit of a likely fire if both smoke and a temperature increase are detected.

10. The system of claim 1, wherein the plurality of detectors include an intrusion detector comprising a microcontroller, a motion sensor, and a sound sensor, wherein the microcontroller selectively powers the motion sensor and sound sensor in different modes of operation to conserve power.

11. The system of claim 10, wherein the motion sensor includes a passive infrared motion sensor that provides an output to the microcontroller indicating whether or not motion is detected.

12. The system of claim 10, wherein the different modes of operation include a mode in which only the motion sensor or the sound sensor is active until a motion or a sound is detected, wherein once a motion is detected, the microcontroller activates the sound sensor, informs the control unit, and monitors continuously with both sensors or once a sound is detected, the microcontroller activates the motion sensor, informs the control unit, and monitors continuously with both sensors, and wherein the microcontroller alerts the control unit if both motion and sound are detected.

13. The system of claim 1, wherein the plurality of detectors include a flood detector comprising a microcontroller and a water leakage sensor.

14. The system of claim 1, wherein the plurality of detectors include an air quality detector comprising a microcontroller, a combination sensor for carbon dioxide and total volatile organic compounds, a humidity and temperature sensor, a dust sensor, and an ambient light sensor, wherein the microcontroller powers the combination sensor, humidity and temperature sensor, dust sensor, total volatile organic compounds sensor, and ambient light sensor in time intervals to conserve power.

15. The system of claim 3, wherein the user interface comprises a plurality of configurable icon groupings that are configurable by a user by function, where each icon represents a detector output and/or a home system that is controlled by the system.

16. The system of claim 1, wherein the control unit includes an initiating service management that processes communications between the user and the detectors including providing notifications and alert messages to the user, communications between the control unit and the server, communications between the control unit Zigbee enabled devices including said plurality of detectors, and data storage for commands and events.

17. The system of claim 1, wherein the control unit runs an intelligent service management that performs iterative timeline analysis and user behavior analysis on the stored data to recognize usage patterns.

18. The system of claim 17, wherein the intelligent service management performs pattern based classification, proposes different working schedules to the user as recommendations, and implements the recommendations approved by the user.

19. The system of claim 18, wherein the intelligent service management monitors and analyzes home utility and device usages and analyzes the user's usage patterns for the home systems by hidden Markov model and/or Bayesian inference.

20. The system of claim 19, wherein the intelligent service management uses a model to classify user activities and utility and device usage where learned user behavior and timeline correlation are used as inputs to the model.

21. The system of claim 20, wherein the recommendations to the user include minimizing utility usage, providing comfort for a specific user or larger group of users, or setting the home for a special event.

22. The system of claim 21, wherein the intelligent service management module recommends at least one of the following modes to the user based on user behavior analysis and/or timeline analysis:
    an Eco mode for minimizing utility consumption,
    a Comfort mode for creating a comfortable environment for a user,
    a Family Comfort mode for creating a comfortable environment for multiple users, and
    an Event mode for creating an environment for a special occasion.

23. The system of claim 2, wherein the server includes a smart city processing server that provides communications between the control unit and remote emergency and/or security services via a monitoring center that monitors communications between control units and said remote emergency and/or security services for a plurality of home automation systems.

24. The system of claim 23, wherein the smart city processing server clusters communications from a plurality of home automation systems to analyze and determine city wide behavior patterns or trends.

* * * * *